(12) United States Patent
Takano

(10) Patent No.: US 7,991,829 B2
(45) Date of Patent: Aug. 2, 2011

(54) ELECTRONIC DEVICE, NETWORK CONNECTING SYSTEM, NETWORK CONNECTING METHOD, AND PROGRAM PRODUCT THEREFOR

(75) Inventor: Kentaro Takano, Tokyo (JP)

(73) Assignee: Fuji Xerox Co., Ltd., Tokyo (JP)

( * ) Notice: Subject to any disclaimer, the term of this patent is extended or adjusted under 35 U.S.C. 154(b) by 542 days.

(21) Appl. No.: 11/591,606

(22) Filed: Nov. 2, 2006

(65) Prior Publication Data

US 2007/0283040 A1 Dec. 6, 2007

(30) Foreign Application Priority Data

May 31, 2006 (JP) ................................ 2006-151696

(51) Int. Cl.
*G06F 15/16* (2006.01)
(52) U.S. Cl. ........ 709/203; 709/202; 235/375; 713/161; 713/168; 713/169
(58) Field of Classification Search .................. 709/202, 709/203
See application file for complete search history.

(56) References Cited

U.S. PATENT DOCUMENTS

| 7,076,523 B2 * | 7/2006 | Schneider et al. ............ 709/203 |
| 2006/0043164 A1 * | 3/2006 | Dowling et al. .............. 235/375 |
| 2006/0055770 A1 * | 3/2006 | Liu ............................ 348/14.02 |
| 2007/0211140 A1 * | 9/2007 | Ohkawa ..................... 348/14.01 |

FOREIGN PATENT DOCUMENTS

| EP | 1292141 A1 * | 3/2003 |
| JP | A 2003-323387 | 11/2003 |
| JP | A 2004-080750 | 3/2004 |
| JP | A 2005-293577 | 10/2005 |

* cited by examiner

*Primary Examiner* — Yves Dalencourt
(74) *Attorney, Agent, or Firm* — Oliff & Berridge, PLC

(57) ABSTRACT

An electronic device including a memory area that stores a program to be executed by the computer and data, the electronic device connecting a computer and a server device in a communicable state. The program includes a first processing portion that retrieves connection information from the computer and writes the connection information in the memory area when the electronic device is connected to the computer, the connection information being necessary for obtaining a connection with the server device, and a second processing portion that causes the computer to carry out a procedure for obtaining a connection with the server device, using connection information necessary for a connection written in the memory area and transmitted from the server device to the computer.

15 Claims, 26 Drawing Sheets

1. CAPTURING PROGRAM IS AUTOMATICALLY ACTIVATED WHEN USB MEMORY 10 IS INSERTED TO COMPUTER 100, AND CAPTURING IS STARTED

2. CAPTURING PROGRAM IS AUTOMATICALLY ACTIVATED WHEN USB MEMORY 10 IS INSERTED TO COMPUTER 100, AND CAPTURING IS STARTED BY A USER SELECTING "START CAPTURE"

FIG. 19

| CPU | MEMORY | CONNECTION STATUS | TRANSMISSION RATE | RESOLUTION |
|---|---|---|---|---|
| ..... | ..... | ..... | ..... | ..... |
| ..... | ..... | ..... | ..... | ..... |
| ..... | ..... | ..... | ..... | ..... |

FIG. 20

| CPU | MEMORY | CONNECTION STATUS | CPU USAGE STATUS | MEMORY USAGE STATUS | TRANSMISSION RATE | RESOLUTION |
|---|---|---|---|---|---|---|
| ..... | ..... | ..... | ..... | ..... | ..... | ..... |
| ..... | ..... | ..... | ..... | ..... | ..... | ..... |
| ..... | ..... | ..... | ..... | ..... | ..... | ..... |

FIG. 22

| ANNOTATION ID | IP ADDRESS | POSITION INFO | POSITION INFO | GENERATION TIME |
|---|---|---|---|---|
| 0001 | 125456 | 0002 | P1 530-670 | 2006/05/25 13:10:16 |
| ◦◦◦◦ | ◦◦◦◦ | ◦◦◦◦ | ◦◦◦◦ | ◦◦◦◦ |
| | | | | |

| CONFERENCE ID | ABC-123 | | | |
|---|---|---|---|---|
| USER INFORMATION | PEN DEVICE ID | IP ADDRESS | USB MEMORY ID | |
| 234 | 32664 | 3546546 | ABC8789 | |
| ▫ | ▫ | ▫ | ▫ | |
| ▫ | ▫ | ▫ | ▫ | |
| ▫ | ▫ | ▫ | ▫ | |

ELECTRONIC DEVICE, NETWORK CONNECTING SYSTEM, NETWORK CONNECTING METHOD, AND PROGRAM PRODUCT THEREFOR

BACKGROUND

1. Technical Field

The present invention relates to a technique for connecting computers brought by conference participants to a server device that provides a conference system, so as to effectively utilize the computers.

2. Related Art

In recent years, systems that connect computers and realize video conferences between distant locations have been becoming more common. In a video conferencing system, images and sound are transmitted between conference rooms located in distant places from each other, and a conference can be held while each participant sees the faces of the other participants on television screens. In this manner, the conference can be run as if all the participants were in the same conference room, though they are located at distant places in reality. Since there is not actual traveling of the participants, the time and cost of traveling can be reduced.

For remote conferencing, there have been systems that use large screens such as projectors or PDPs set in conference rooms, instead of personal computers sharing images and materials with the others. For example, interactive walls manufactured by Fuji Xerox Co., Ltd. can instantly share images and materials at distant locations.

SUMMARY

An aspect of the present invention provides an electronic device comprising a memory area that stores a program to be executed by the computer and data, the electronic device connecting a computer and a server device in a communicable state. The program includes: a first processing portion that retrieves connection information from the computer and writes the connection information in the memory area when the electronic device is connected to the computer, the connection information being necessary for obtaining a connection with the server device; and a second processing portion that causes the computer to carry out a procedure for obtaining a connection with the server device, using connection information necessary for a connection written in the memory area and transmitted from the server device to the computer.

BRIEF DESCRIPTION OF THE DRAWINGS

Embodiments of the present invention will be described in detail based on the following figures, wherein:

FIG. 19 shows a management table that manages transmission rates and resolutions in accordance with the static capacities of the computer;

FIG. 20 shows a management table that manages transmission rates and resolutions in accordance with the static capacities and the dynamic capacities of the computer;

FIG. 22 shows an annotation management table managed in the annotating unit;

DETAILED DESCRIPTION

A description will now be given, with reference to the accompanying drawings, of exemplary embodiments of the present invention.

First Exemplary Embodiment

Figure 1:
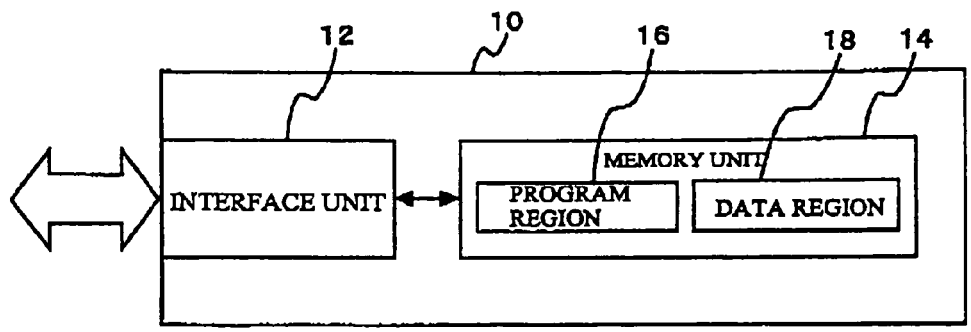
FIG. 1 shows the structure of a USB memory in accordance with the present invention.

Referring first to FIG. 1, the structure of an electronic device 10 is described. The electronic device 10 connects a computer 100 owned by a user to a server device 30. After the connection, the electronic device 10 functions to capture a monitor screen displayed on the computer 100, and upload the captured monitor screen onto the server device 30.

The electronic device 10 is a memory that can be detachable from a computer, and serves as a USB memory, for example. In the following, the electronic device 10 is described as the USB memory 10. The USB memory 10 includes an interface unit 12 and a memory unit 14. The memory unit 14 includes a program region 16 and a data region 18 as storage areas. The memory unit 14 is not divided into the program region 16 and the data region 18 originally, but the memory region that stores programs is referred to as a program region while the memory region that stores data is referred to as a data region. The interface unit 12 serves as an interface with an external device such as a computer, and is generally used in a USB memory. The interface unit 12 has a USB controller (hardware) and software that enables initialization, connection, transmission, cutoff, and the likes.

Figure 2:
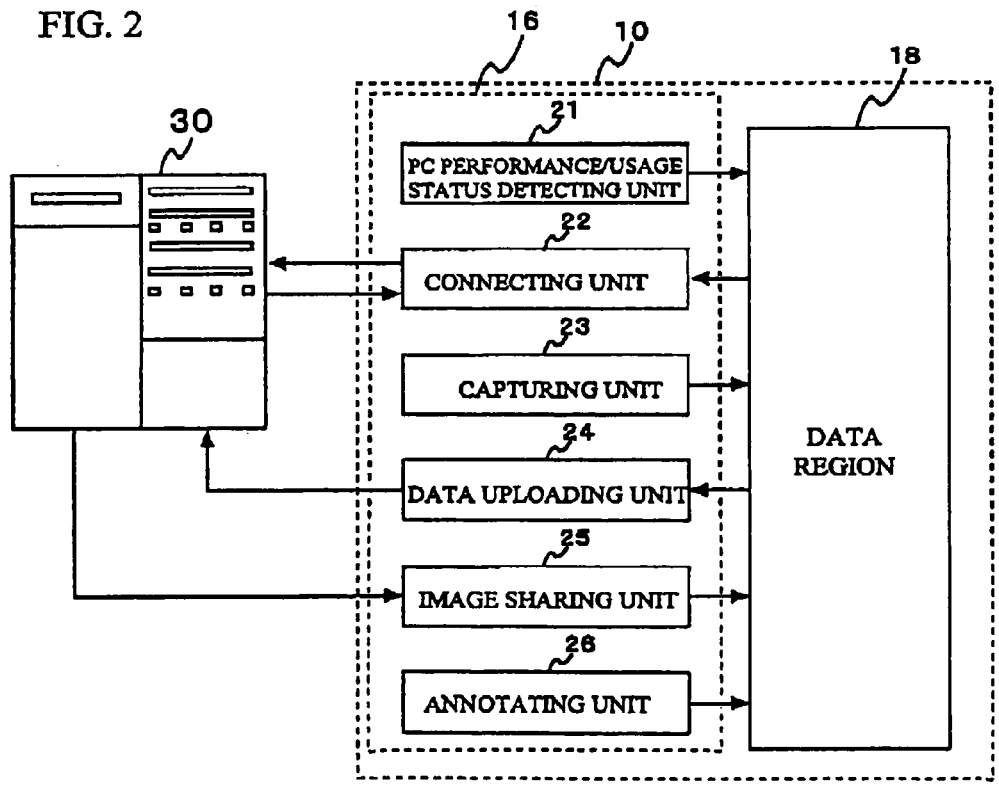
FIG. 2 is a block diagram of the functions to be realized by a computer reading a program written in the USB memory.

FIG. 2 shows a block diagram of the functions realized by the computer 100 reading the programs stored in the program region 16. As shown in FIG. 2, the program region stores programs for realizing a PC performance/usage status detecting unit 21 (first processing portion), a connecting unit 22 (second processing portion), a capturing unit 23 (third processing portion and seventh processing portion), a data uploading unit 24 (fourth processing portion and eighth processing portion), an image sharing unit 25 (fifth processing portion), and an annotating unit 26.

Figure 3:
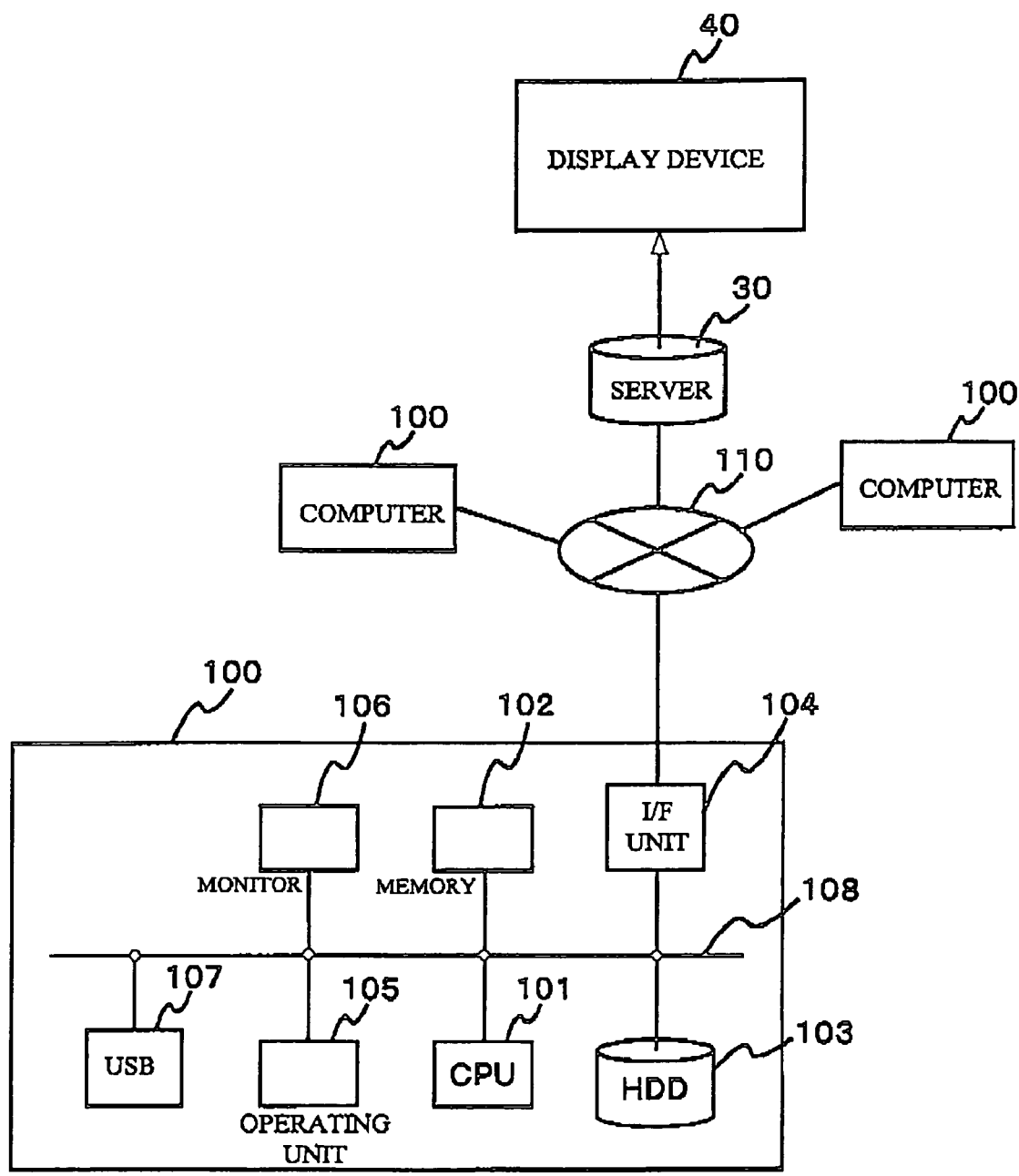
FIG. 3 shows the arrangement of computers and the structure of a network that connects the computers and a server device.

The USB memory 10 shown in FIG. 1 is connected to the computer 100 shown in FIG. 3. The computer 100 executes the programs of the respective components shown in FIG. 2, so as to realize the above described processing portions. The computer 100 includes a CPU 101, a memory 102, a HDD 103, a communication interface (I/F) unit 104, an operation unit 105 formed with a mousse, a keyboard, and the likes, a monitor 106, and USB terminals 107 forming external interfaces. The USB memory is inserted to a USB terminal 107. The computer 100 is connected to a network 110 via the communication I/F unit 104, and exchanges data with the server device 30 also connected to the network 110. In FIG. 3, computers 100 are connected to the network 110, and each of those computers 100 is connected to the server device 30 through the USB memory 10 and can communicate with the server device 30. Also, the computers 100 connected to the network 110 can communicate with one another.

Each of the functions shown in FIG. 2 is now described. When the USB memory 10 is inserted to the USB terminal 107 of the computer 100, a program is automatically executed by a known auto-run facility, so that the computer 100 executes predetermined commands.

As the USB memory 10 is inserted to the computer 100, the PC performance/usage status detecting unit 21 first instructs the CPU 101 to execute commands "/proc/devices" and "/proc/cpuinfo". In accordance with the instruction from the PC performance/usage status detecting unit 21, the CPU 101 executes the command "/proc/devices", and sends device information as the execution result to the USB memory 10. The PC performance/usage status detecting unit 21 then causes the CPU 101 to execute a command such as "ipconfig" or "ifconfig". The CPU 101 executes the command "ipconfig" or "ifconfig", to detect the IP address of the computer 100. Under the control of the PC performance/usage status detecting unit 21, the obtained device information and IP address are written into the data region 18.

The connecting unit 22 is automatically activated by the auto-run facility or is activated by an activation instruction from a user through the operating unit 105 shown in FIG. 3. The connecting unit 22 stores the program for connecting the computer 100 to the server device 30. After reading the program stored in the connecting unit 22, the CPU 101 of the computer 100 reads the necessary information stored in the data region 18 for obtaining a connection with the server device 30, and carries out the procedures for obtaining a connection with the server device 30.

The capturing unit 23 is automatically activated by the auto-run facility or is activated by an activation instruction from a user through the operating unit 105 shown in FIG. 3. The capturing unit 23 captures image data that is displayed on the monitor 106 of the computer 100, and audio data that is input through a microphone 112 connected to the USB terminal 107. The capturing unit 23 stores those data in the data region 18 of the USB memory 10 shown in FIG. 1. A camera may be connected to the computer 100, so as to film a conference and store the recorded data as conference information in the data region 18. The capturing may be performed in the timing in which an operator operates the computer during a presentation or may be performed at a constant frequency.

The data uploading unit 24 is automatically activated by the auto-run facility or is activated by an activation instruction from a user through the operating unit 105 shown in FIG. 3. When data is stored in the data region 18, the data uploading unit 24 uploads the data onto the server device 30. The image sharing unit 25 is automatically activated by the auto-run facility or is activated by an activation instruction from a user through the operating unit 105 shown in FIG. 3. The image sharing unit 25 accesses the server device 30 at predetermined intervals, and obtains screen data, audio data, and annotation data registered in the server device 30.

The annotating unit 26 performs control, so as to display annotation data added in accordance with a program stored in the USB memory automatically activated by the auto-run facility, or annotation data downloaded from the server device 30.

In this exemplary embodiment, the USB memory 10 having the above described structure is first inserted into the computer 100. A program written in the USB memory 10 is then automatically activated so as to perform the following operation.

The PC performance/usage status detecting unit 21 realized by the computer 100 reading the program detects the device information as to the computer 100, and the information as to the CPU 101 and the memory 102.

Figure 4:
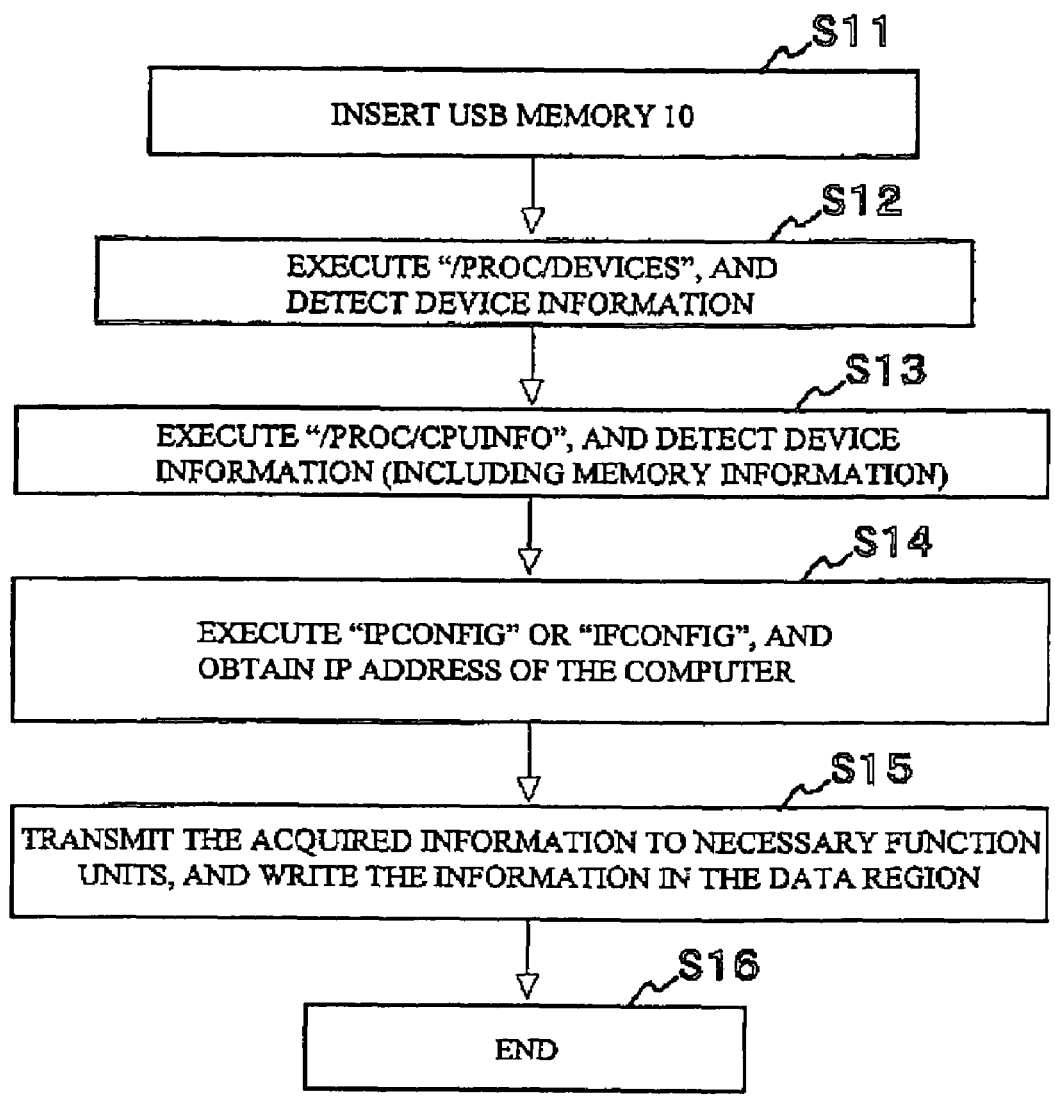
FIG. 4 shows a program structure of the PC performance/ usage status detecting unit as well as a program structure for detecting static information.

FIG. 4 is a flowchart showing the procedures for detecting static information (the information unique to the device) in accordance with the program for realizing the PC performance/usage status detecting unit 21. When the CPU 101 detects the insertion of the USB memory 10 into the computer 100 (step S11), the CPU 101 executes the command "/proc/devices" in accordance with the program read from the program region 16, and obtains the device information (step S12). The device information is the information as to an external device connected to the computer 100 or a device built in the computer 100. For example, the device information may include the information as to a communication device (such as an infrared communication device, a Bluetooth device, or a wireless communication device) provided in the computer 100.

The CPU 101 then executes the command "/proc/cpuinfo" to detect the device information as to the CPU 101 (including the memory) (step S13). The CPU 101 further executes the command "ipconfig" or "ifconfig" to obtain the IP address of the computer 100 (step S14). After storing the device information obtained in steps S12, S13, and S14 into the data region 18, the CPU 101 transmits the information to necessary function units (step S15).

Figure 5:
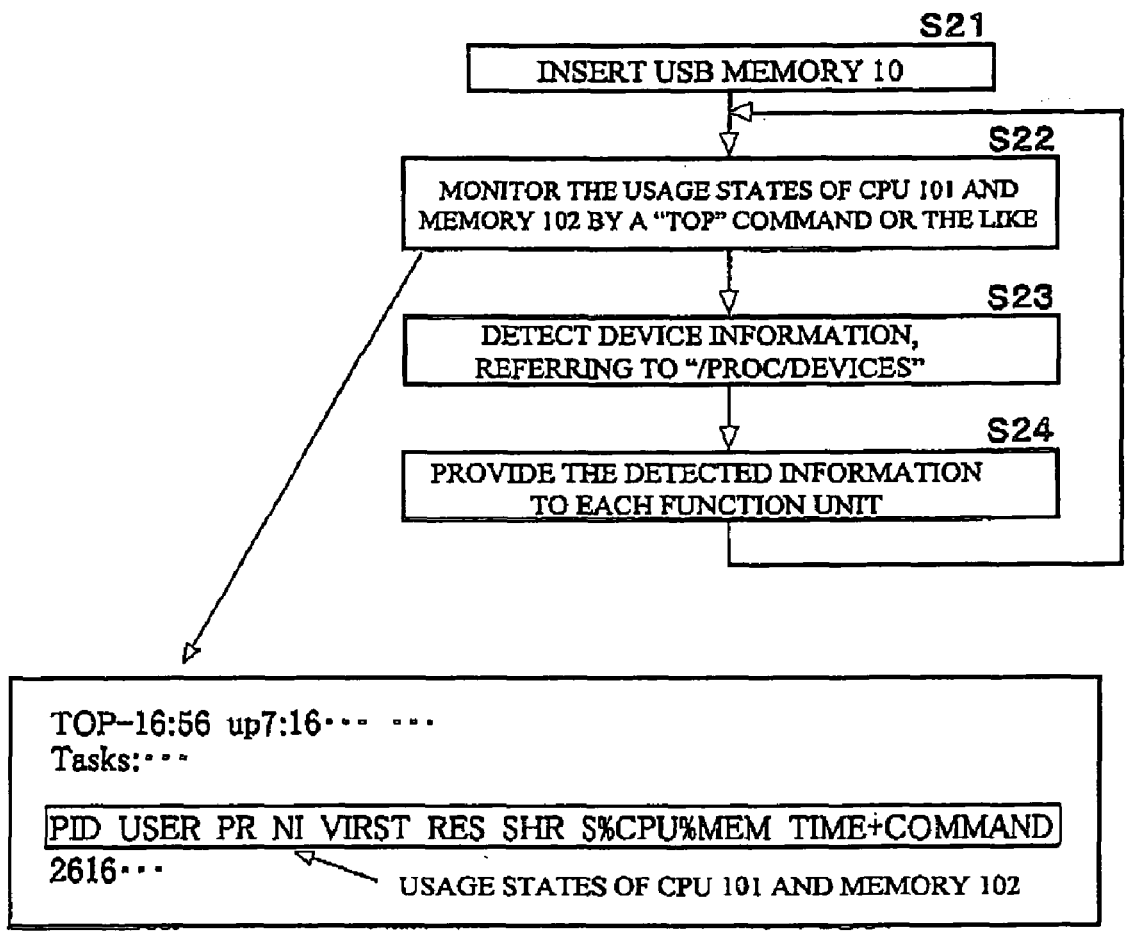
FIG. 5 shows a program structure of the PC performance/ usage status detecting unit as well as a program structure for detecting dynamic information.

FIG. 5 is a flowchart showing the procedures for detecting dynamic information (the information that varies with operations) in accordance with the program for realizing the PC performance/usage status detecting unit 21. When the CPU 101 detects the insertion of the USB memory 10 into the computer 100 (step S21), the CPU 101 monitors the usage states of the CPU 101 and the memory 102 in accordance with a "top" command or the like (step S22). An example of the data obtained in step S22 is shown in FIG. 5 (the highlighted information). Referring to "/proc/devices", the CPU 101 detects device information (step S23). After storing the device information obtained in steps S22 and S23 into the data region 18, the CPU 101 transmits the information to each function (step S24). After step S24, the operation returns to step S22, and the CPU 101 repeats the above procedures.

After the PC performance/usage status detecting unit 21 writes the device information, the information as to the CPU and the memory, and the connection information such as the IP address information into the data region 18 of the USB memory 10, the USB memory 10 is detached from the computer 100 and is inserted to the server device 30.

Figure 6:
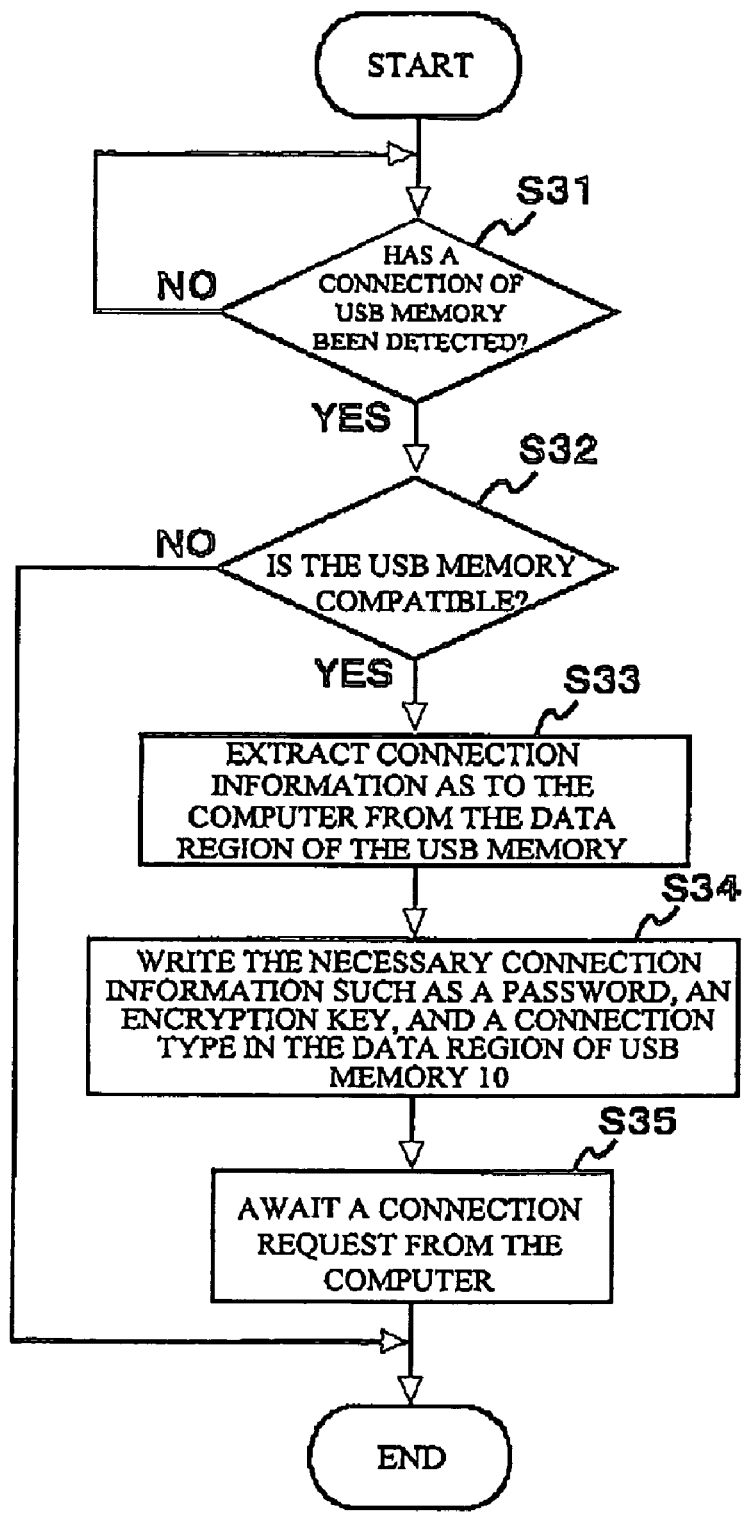
FIG. 6 is a flowchart showing procedures to be carried out by the server device connected to the USB memory.

Referring now to FIG. 6, the procedures to be carried out by the server device 30 having the USB memory 10 connected thereto are described.

When detecting the insertion of the USB memory 10 ("YES" in step S31), the server device 30 determines whether the inserted USB memory 10 is a USB memory prepared for the subject system (step S32). IDs for identifying each device, such as a vendor ID and a product ID, are allotted to each USB device. Those IDs can be recognized by the processor of the server device 30 executing commands such as "lsusb" and "/proc/bus/usb/devices" in a case of a UNIX (a registered trade name) OS. The server device 30 performs the determination by comparing the product ID with the ID registered beforehand in the server device. When determining that the inserted USB memory is a compatible USB memory ("YES" in step S32), the server device 30 obtains the connection information as to the computer 100 from the data region 18 of the USB memory 10 (step S33). The server device 30 then writes the necessary information for a connection to be transmitted from the server device 30 to the computer 100, such as a password, an encryption key, a connection method, and the likes, into the data region 18 of the USB memory 10 (step S34). After the writing of the necessary information for a connection, the server device 30 awaits a connection request from the corresponding computer 100 (step S35).

The USB memory 10 having the necessary information for a connection with the server device 30 written therein is detached from the server device 30, and is reconnected to the computer 100.

Figure 7:
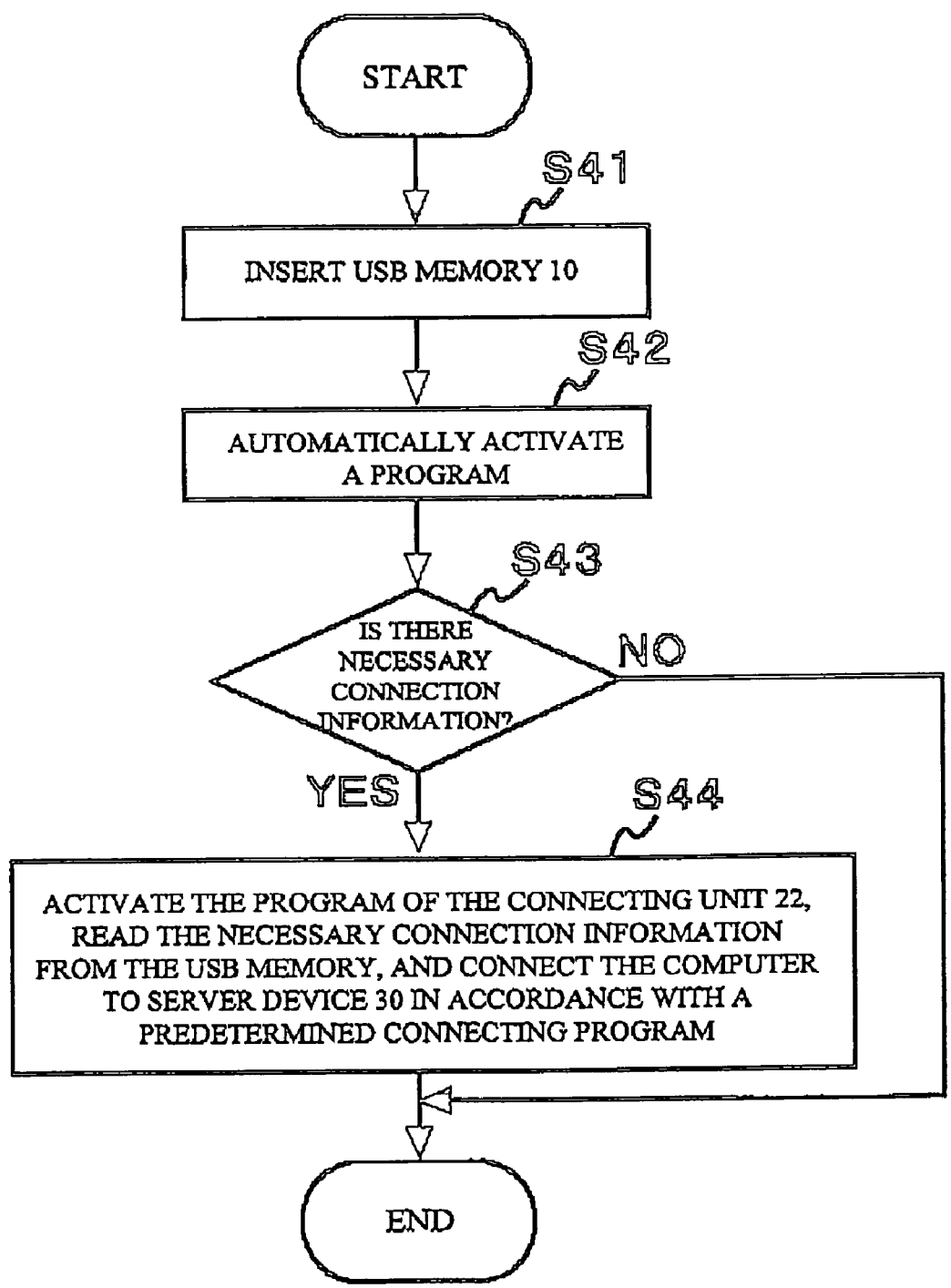
FIG. 7 shows the program structure of the connecting unit.

FIG. 7 shows the procedures to be carried out when the USB memory 10 having the connection necessary information written herein is reconnected to the computer 100.

When the USB memory 10 is inserted to the computer 100 (step S41), the computer 100 reads a program written in the program region 16, and automatically executes the program (step S42). The CPU 101 of the computer 100 detects the necessary information for a connection written in the data region 18 (step S43). The CPU 101 reads the necessary information for a connection from the USB memory 10 by virtue of the operation by the connecting unit 22, and the computer 100 is connected to the server device 30 in accordance with a predetermined connecting program (step S44).

As described above, the USB memory 10 is connected to the computer 100 and the server device 30, so that the computer 100 and the server device 30 can be easily connected. When the USB memory 10 having the necessary information for a connection with the server device 30 written therein is reinserted to the computer 100, the monitor 106 of the computer 100 may display the information relating to the communication devices provided in the server device 30 and the computer 100. A user selects a desired device from the communication devices displayed on the monitor 106, so that the connecting unit 22 can carry out the connecting procedures using the selected communication device.

Figure 8:
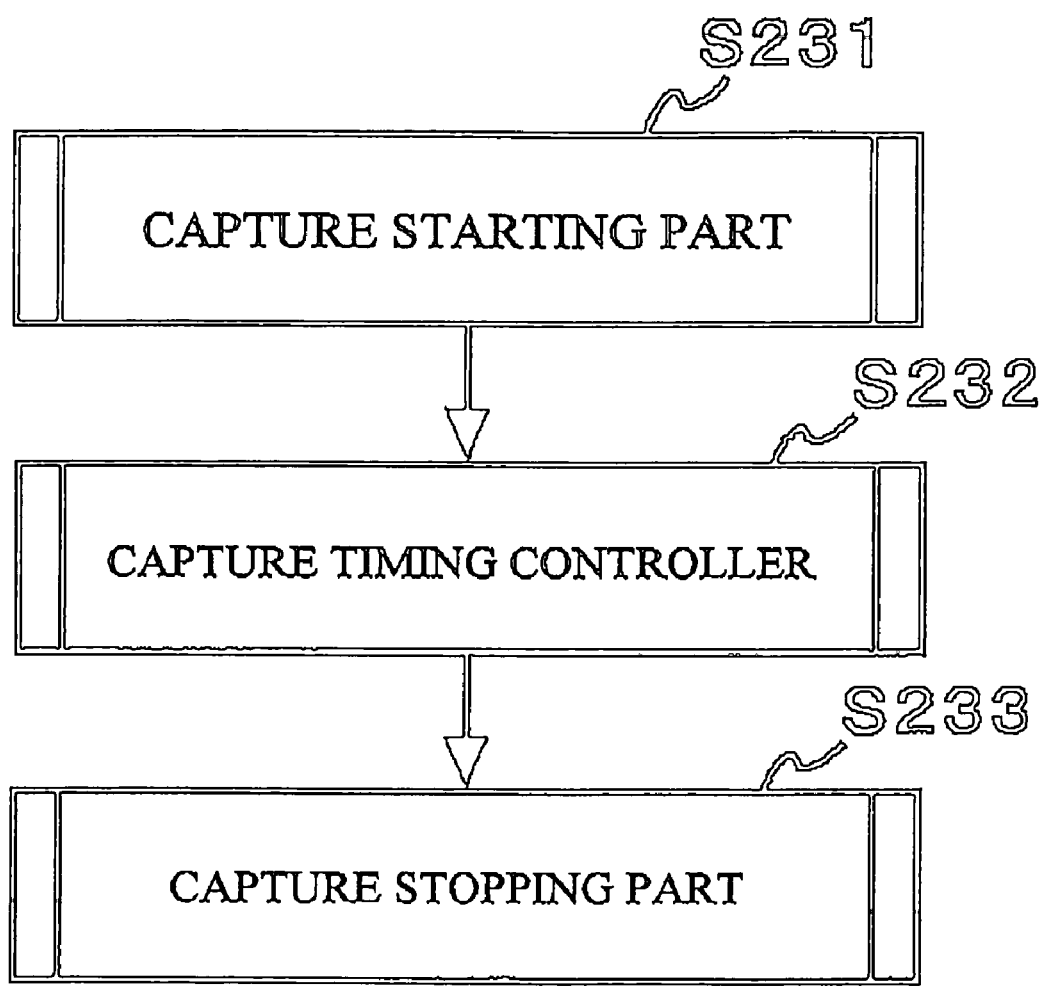
FIG. 8 shows the structure of the capturing unit.

Next, the capturing unit 23 is described. FIG. 8 is a block diagram of the structure of the capturing unit 23.

Figure 9A:
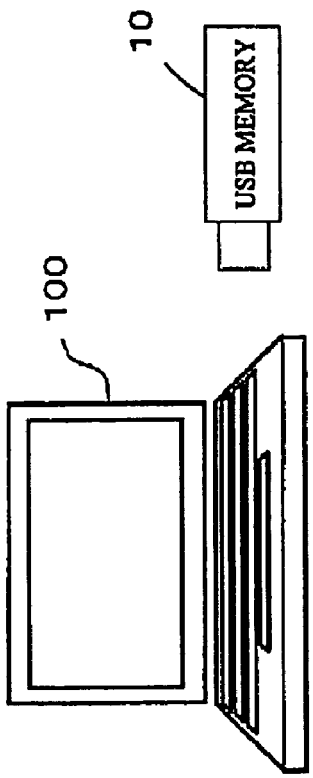
FIGS. 9A and 9B show timings for capturing operations.
Figure 9B:
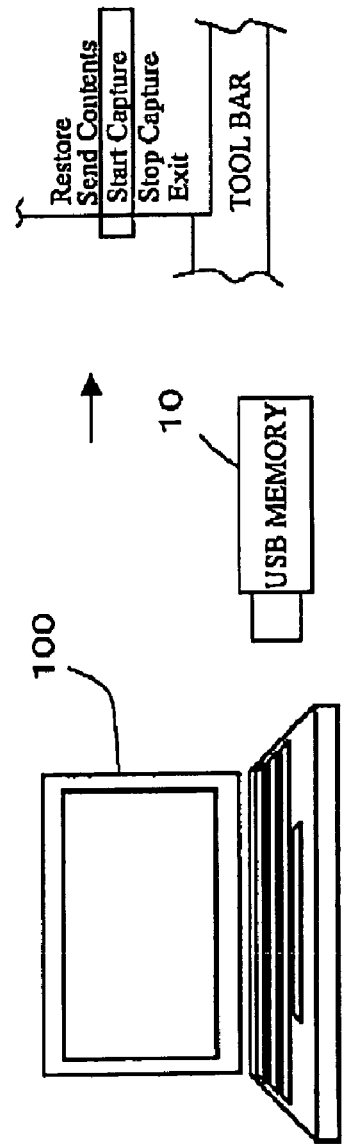

The capturing unit 23 includes a capture starting part S231, a capture timing controller S232, and a capture stopping part S233. FIGS. 9A and 9B illustrate the structure of the capture starting part S231. In some cases, when the USB memory 10 is inserted to the computer 100, capturing is started as the capturing unit 23 is automatically activated (more specifically, the program for realizing the capturing unit 23 is activated), as shown in FIG. 9A. In other cases, when the USB memory 10 is inserted to the computer 100, capturing is not started, but a predetermined program is activated through task bars or the likes, as shown in FIG. 9B. In the case shown in FIGS. 9A and 9B, a user operates the operating unit such as a mouse and a keyboard, so as to set the timing.

Figure 10:
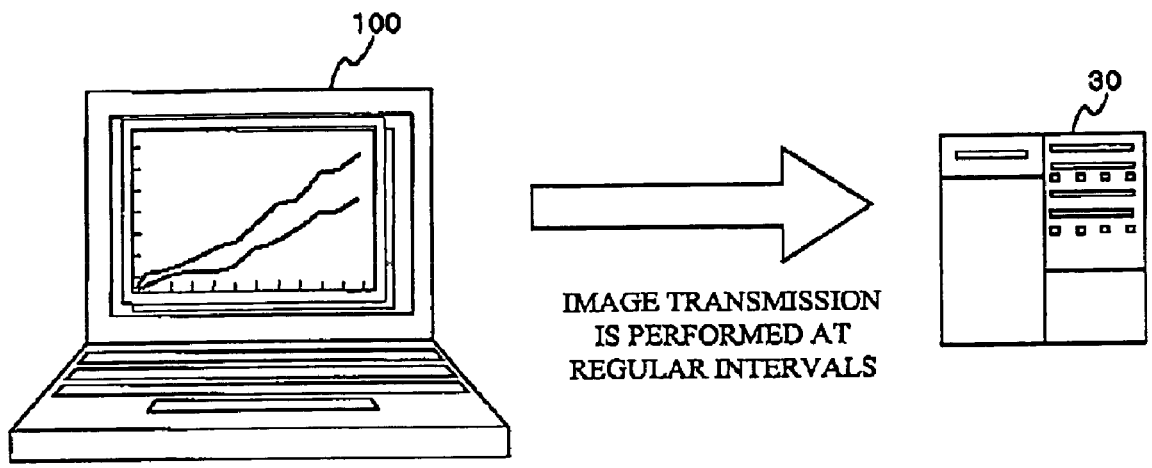
FIG. 10 shows an example case where screen data is captured in predetermined timing and is transmitted to the server device.
Figure 11:
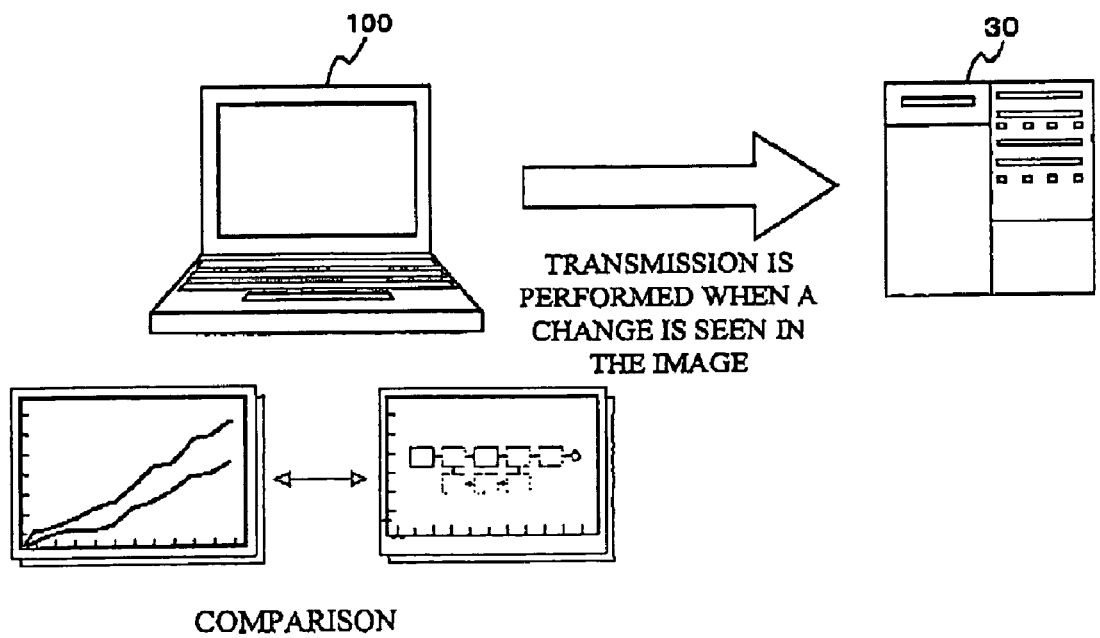
FIG. 11 shows an example case where a change in captured screen data is detected, and the screen data having the change is transmitted to the server device.

The capturing unit 23 is automatically activated when the USB memory 10 is inserted to the computer 100, and captures the monitor of the computer 100 in predetermined timing. In some cases, a monitor image is captured and uploaded onto the server device 30 at regular intervals, as shown in FIG. 10. In other cases, a monitor image is captured and uploaded onto the server device 30 when a change in the monitor screen is detected, as shown in FIG. 11.

Figure 12:
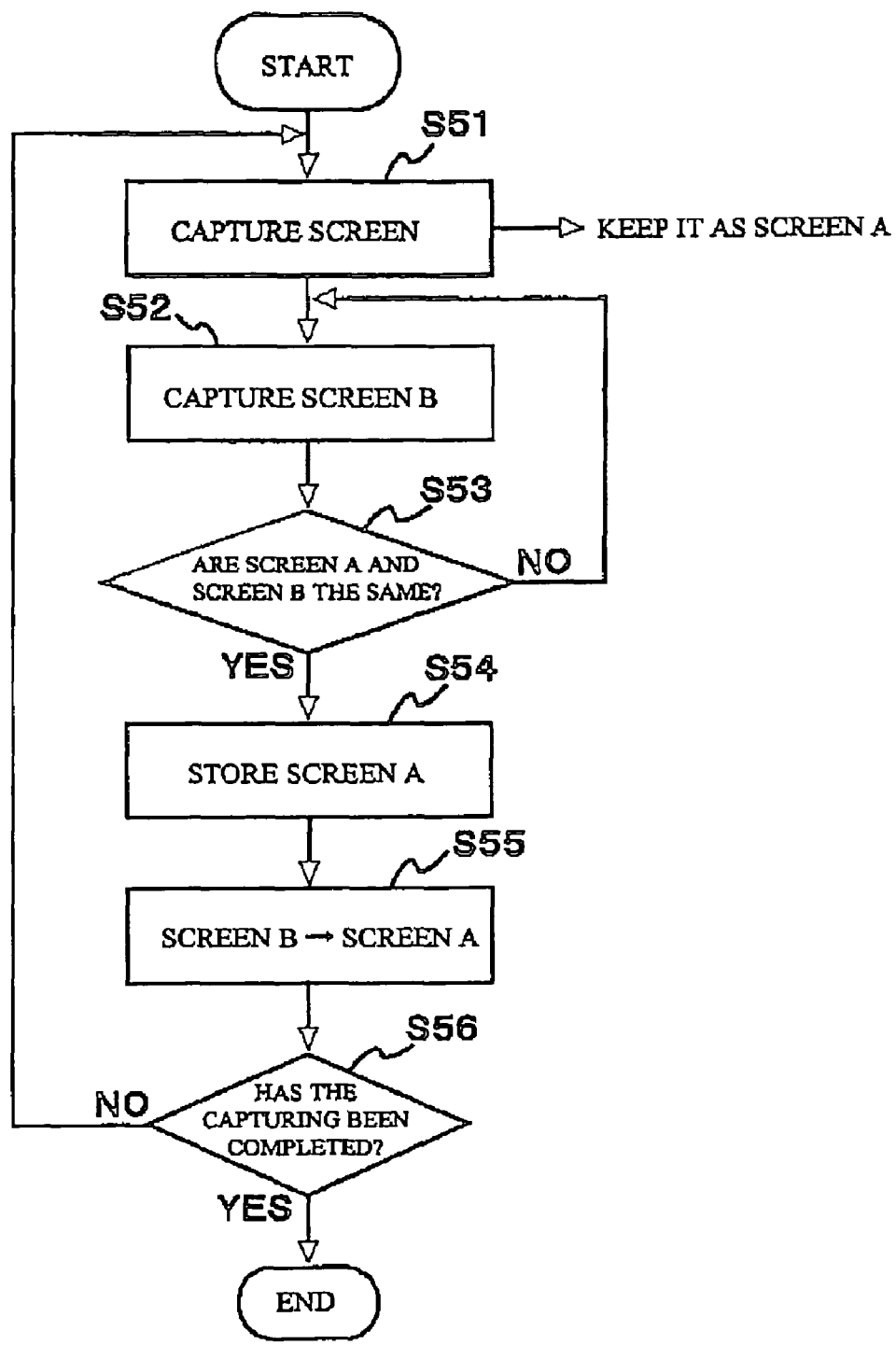
FIG. 12 shows an example of the program structure of the capturing unit.

Referring now to FIG. 12, the procedures to be carried out in accordance with the program for capturing a monitor image only when there is a change in the screen are described.

After a start of execution of the program shown in FIG. 12, the CPU 101 captures the screen on the monitor 106 (step S51), and sets this screen as screen A. The CPU 101 then captures the screen at regular intervals (sets the screen as screen B) (step S52). The CPU 101 determines whether the screen A and the screen B are the same (step S53). If the screen A and the screen B are the same ("YES" in step S53), the CPU 101 returns to step S52, and continues to capture the screen. If the screen A and the screen B are different from each other ("NO" in step S53), the CPU 101 stores the screen A in the data region 18 (step S54). The CPU 101 then sets the data of the screen B as the data of a new screen A (step S55). When receiving a stop instruction issued from the capture stopping part S233 shown in FIG. 8 ("YES" in step S56), the CPU 101 stops the operation. The stop instruction is issued by the capture stopping part S233 when the USB memory 10 is pulled out of the computer 100 or in accordance with a mouse or key operation on the operating unit 105, for example.

Figure 13:
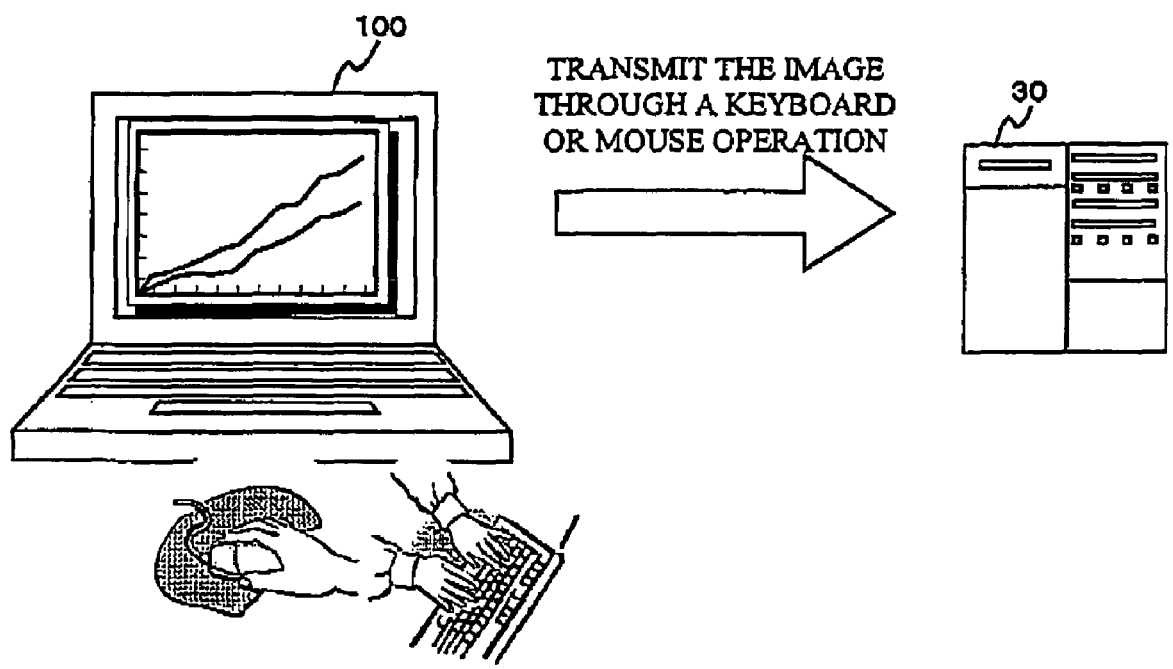
FIG. 13 shows an example case where screen data is captured through a key operation or a mouse operation, and the captured screen data is transmitted to the server device.
Figure 14:
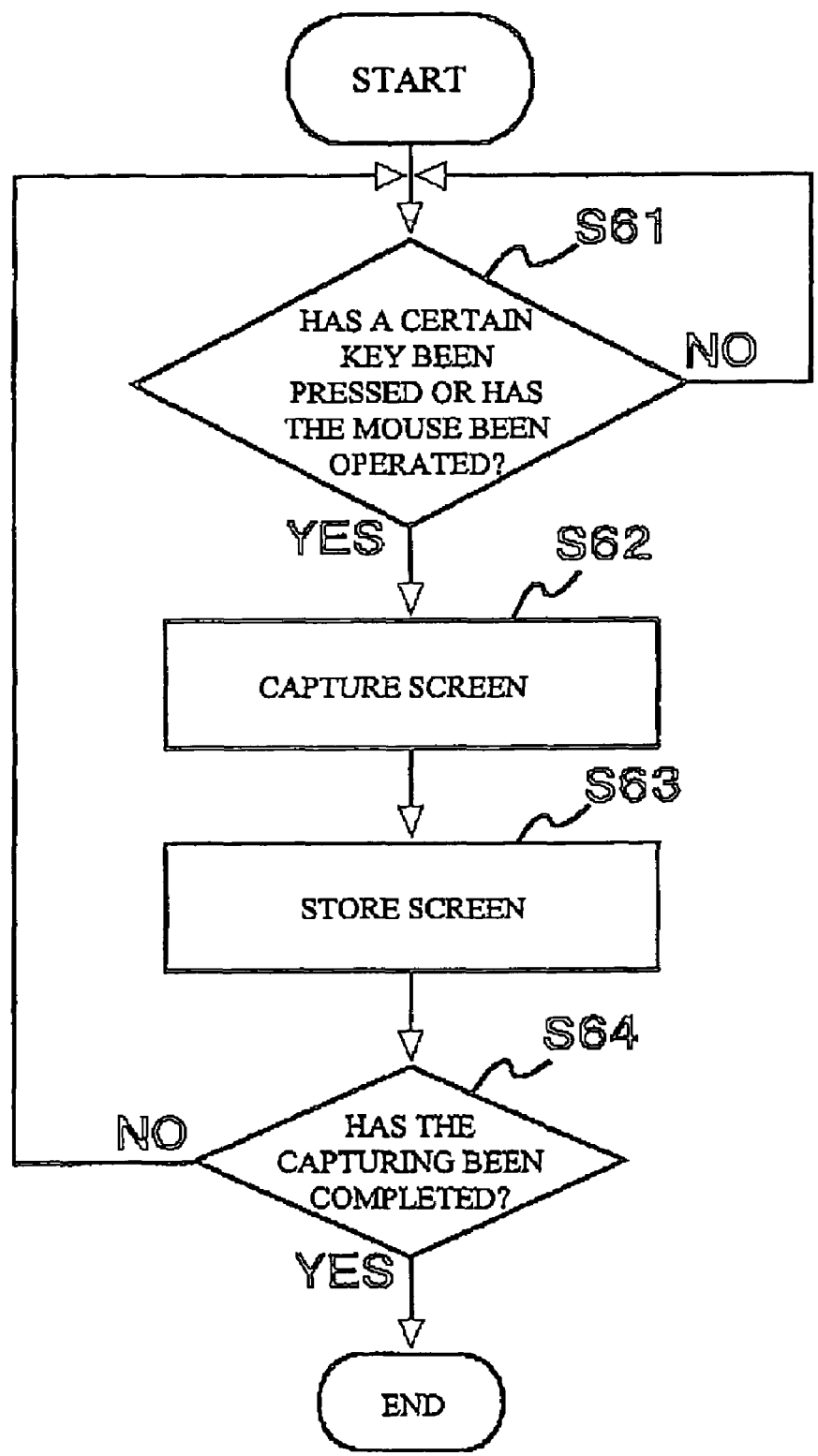
FIG. 14 shows the structure of a program for capturing screen data when a predetermined key is pressed.

It is also possible to perform capturing when a user performs a certain key operation, as shown in FIG. 13. The procedures to be carried out in that case are now described, with reference to FIG. 14.

After the program for realizing the capture timing controller S232 is activated, the CPU 101 monitors key operations on the keyboard and mouse operations (step S61). When detecting a certain key operation on the keyboard or a mouse operation ("YES" in step S61), the CPU 101 captures the screen (step S62), and stores the captured screen in the data region 18 of the USB memory 10 (step S63). If there is not a stop instruction issued from the capture stopping part S233 ("NO" in step S64), the CPU 101 returns to step S61 to monitor mouse and keyboard operations. If there is a stop instruction ("YES" in step S64), the CPU 101 ends the operation.

Also, it is possible to determine whether a predetermined application (such as "ppt") is in operation, and perform capturing in accordance with the operation of the application. The procedures to be carried out in that case are now described, with reference to FIG. 15.

Figure 15:
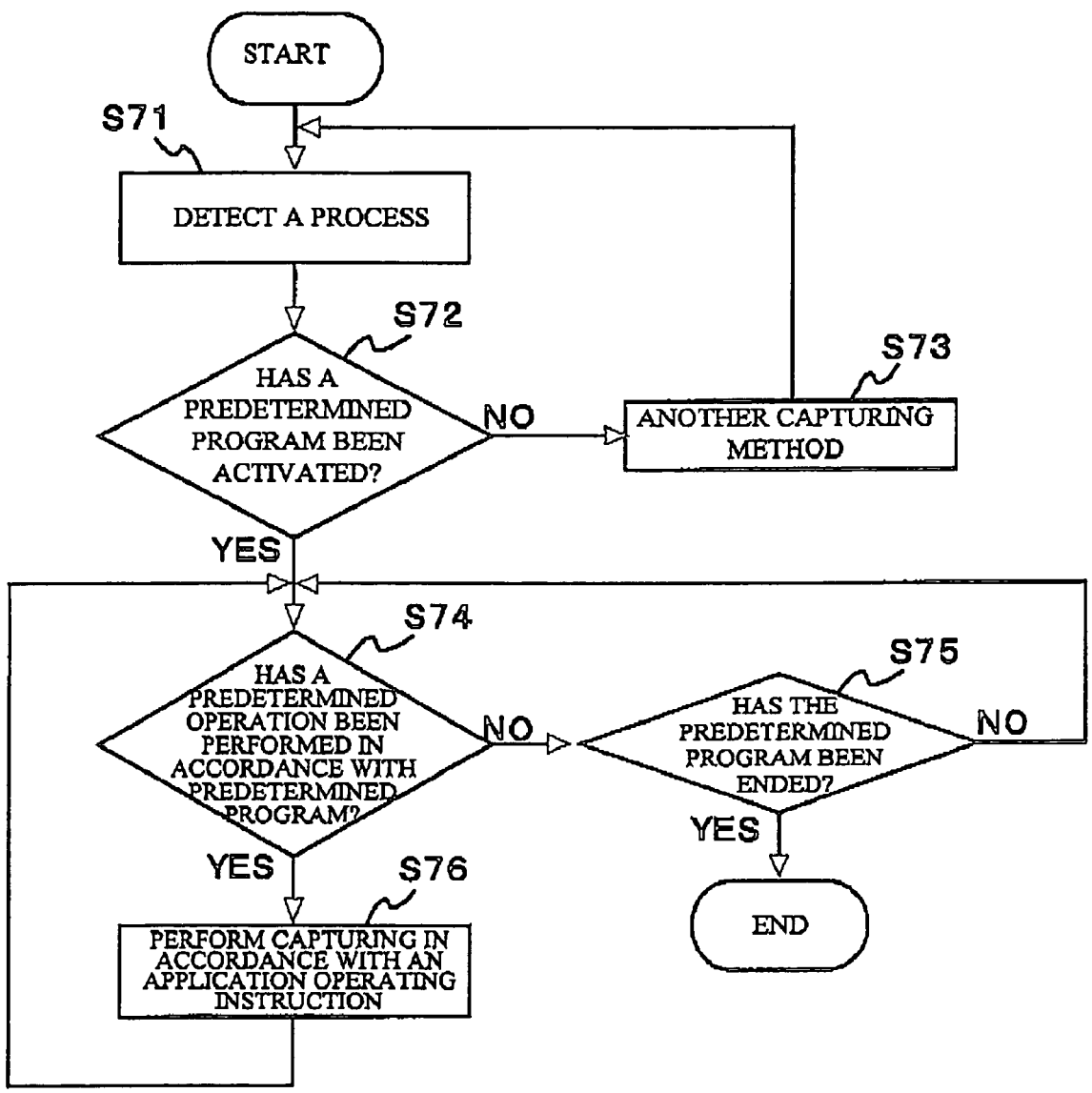
FIG. 15 shows the structure of a program for capturing screen data when a predetermined operation is performed in accordance with a predetermined program.

After a start of execution of the program shown in FIG. 15, the CPU 101 performs a process detecting operation (step S71). The CPU 101 determines whether activation of a predetermined program has been detected (step S72). A "predetermined program" is a program for presentations, for example. If the determination result of step S72 is "NO", the CPU 101 performs some other type of capturing (step S73). If the determination result of step S72 is "YES", the CPU 101 determines whether a predetermined operation has been performed in accordance with the predetermined program (step S74). A "predetermined operation" is an operation for switching slides, for example. When detecting a predetermined operation, the CPU 101 performs capturing in accordance with the detected application operating instruction (step S76). In a case where a predetermined operation is not input even after the predetermined program is activated ("NO" in step S74), the CPU 101 determines whether the predetermined program has been ended (step S75). In a case where the predetermined program has been ended (step "YES" in step S75), the CPU 101 ends the operation.

Next, the data uploading unit 24 is described. When data that has not been transmitted to the server device 30 is stored in the data region 18 of the USB memory 10, the data uploading unit 24 retrieves the data and uploads the data onto the server device 30. When the mouse is handled or a certain button on the keyboard is pressed, the data uploading unit 24 transmits the image data stored in the data region 18 to the server device 30. The data to be uploaded onto the server device 30 by the data uploading unit 24 includes not only the data of the screen captured by the capturing unit 23 but also annotation information (described later) obtained by the annotating unit 26. In a case where a device such as a microphone is connected to the computer 100 and audio data is obtained from a user through the microphone, the audio data is also uploaded onto the server device 30.

Figure 16:
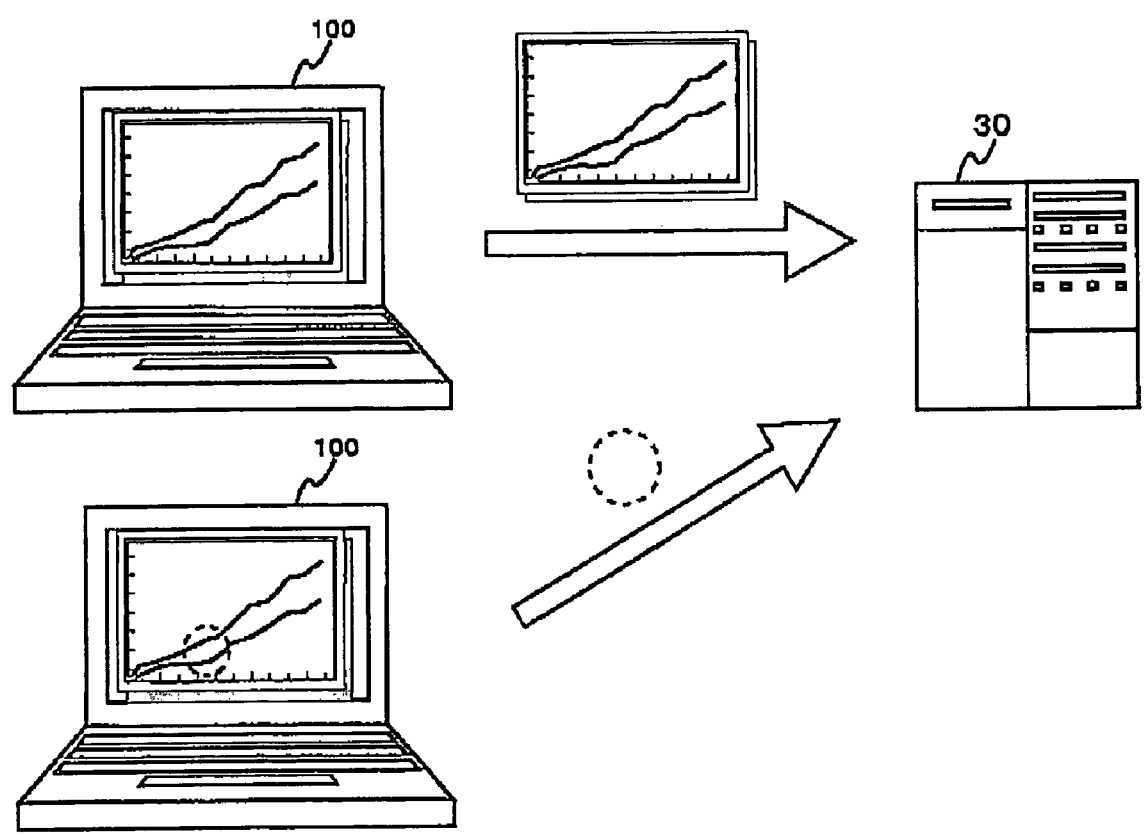
FIG. 16 shows an example case where the difference in screen data is detected, and the difference data is transmitted to the server device.

In FIG. 12, the data of the entire captured screen is uploaded onto the server device 30. However, the capturing unit 23 may detect a screen data difference and uploads only the detected difference image onto the server device 30, as shown in FIG. 16.

Figure 17:
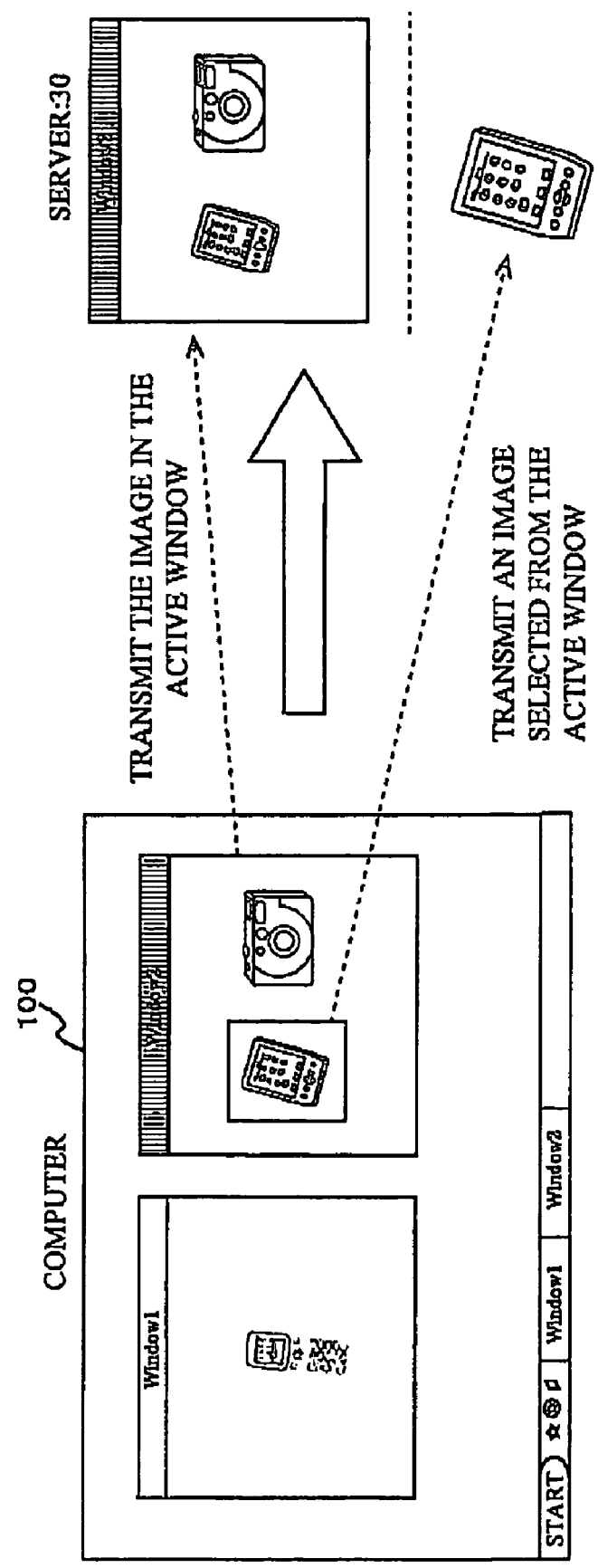
FIG. 17 shows an example case where the screen data in an active window is transmitted to the server device.

Also, only a part of a screen designated through the mouse or the operation unit may be uploaded onto the server device 30. For example, in an example case shown in FIG. 17, only an active window on the screen designated through the mouse is uploaded onto the server device 30. Also, only an image designated through the mouse can be captured from an active window and is then uploaded onto the server device 30.

Figure 18:
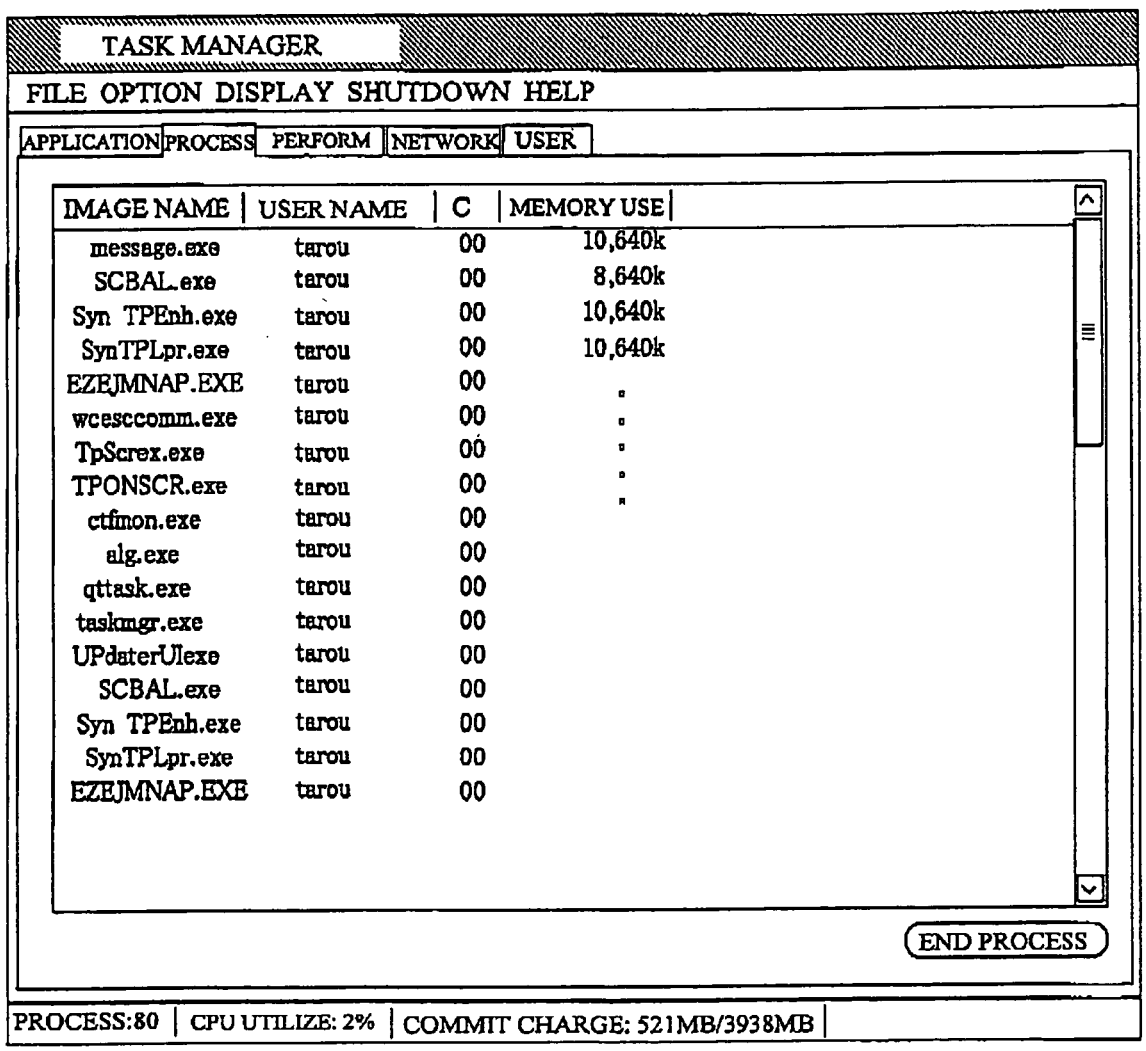
FIG. 18 shows the dynamic capacities of a computer displayed by the task manager.

In this exemplary embodiment, the PC performance/usage status detecting unit 21 detects the states of the CPU 101 and the memory 102 statically and dynamically. The static information includes the operating frequency of the CPU 101, and the operation frequency and the capacity of the internal memory. The dynamic information includes the usage rates and the commit charge of the CPU 101, as shown in FIG. 18.

In accordance with the static information and the dynamic information, the transmission rate in communications between the computer 100 and the server device 30, and the resolution at which the capturing unit 23 captures screen data may be changed. FIG. 19 shows an example case where the transmission rate and the screen capturing resolution are changed in accordance with the static information. FIG. 20 shows an example case where the transmission rate and the screen capturing resolution are changed in accordance with the static information and the dynamic information.

Next, the image sharing unit 25 is described. The image sharing unit 25 accesses the server device 30 at a constant frequency, and downloads (Pull) the screen data uploaded onto the server device 30 by another computer.

Figure 21:
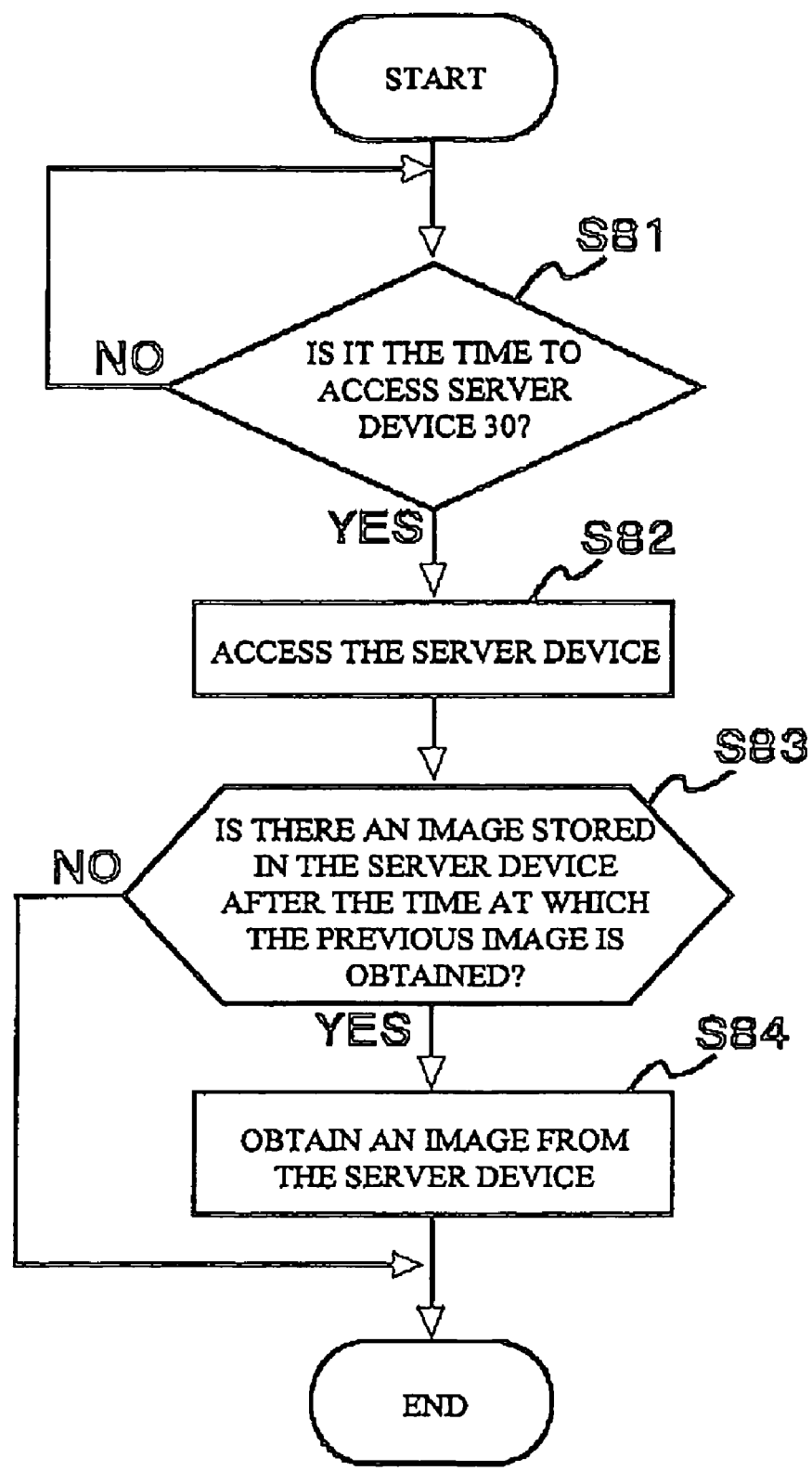
FIG. 21 shows a program structure of the image sharing unit.

Referring now to the flowchart shown in FIG. 21, the procedures to be carried out by the image sharing unit 25 are described. When an access is to be made to the server device 30 ("YES" in step S81), the image sharing unit 25 accesses the server device 30, and determines whether there is screen data that is stored in the server device 30 after the acquirement time of the previously obtained screen data (step S83). If there is screen data that is stored in the server device 30 by another computer 100 after the acquirement time of the previous screen data ("YES" in step S83), the image sharing unit 25 downloads the screen data (step S84). If there is no screen data that is stored in the server device 30 after the acquirement time ("NO" in step S83), the image sharing unit 25 ends the operation.

Figure 23:
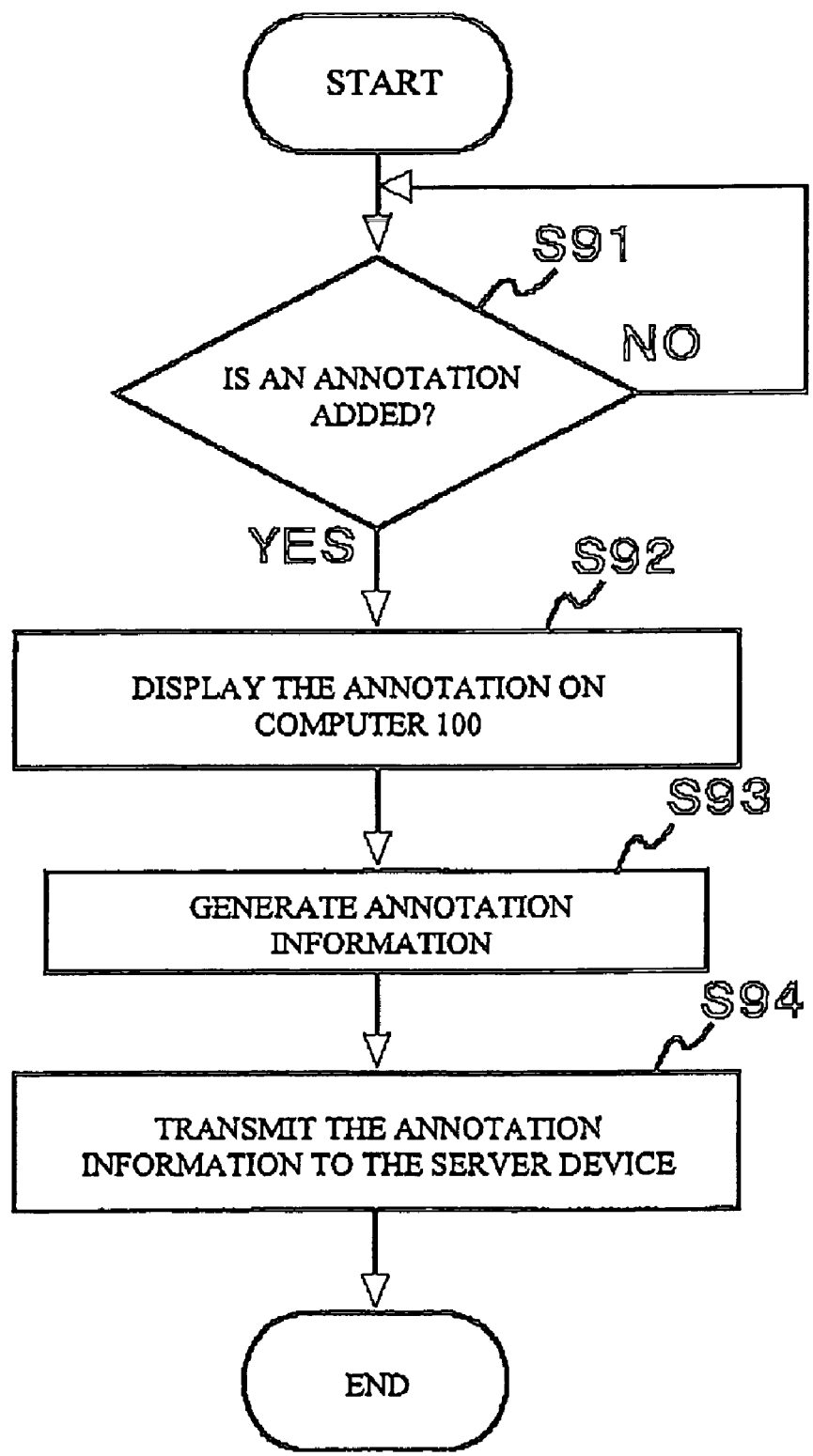
FIG. 23 shows a program structure of the annotating unit.

Referring now to FIG. 23, the annotating unit 26 is described.

When an annotation is added by an operation of the mouse or a touch pen while the screen data downloaded from the server device 30 is displayed on the monitor 106 (step S91), the annotating unit 26 causes the monitor 106 of the computer 100 to display the annotation (step S92), and generates annotation information (step S93). FIG. 22 shows an example of the annotation information generated by the annotating unit 26. The generated annotation information may include the ID to be allotted to the annotation, the IP address of the computer 100 that adds the annotation, the ID for identifying the screen data to which the annotation is added, the position information indicating the position of the added annotation, and the time at which the annotation is added.

The generated annotation information is stored in the data region 18 by the annotating unit 26, and is uploaded onto the server device 30 by the data uploading unit 24 (step S94). The annotation information uploaded onto the server device 30 is accumulated in the server device 30, and is displayed on the server device 30 and the monitor 106 of another computer 100 that is to obtain the annotation information. The server device 30 searches for conference materials or the likes, using the annotation information.

Second Exemplary Embodiment

Referring to the accompanying drawings, a second exemplary embodiment of the present invention is now described. In this exemplary embodiment, the server device 30 combines screen data, audio data, and annotation data transmitted from computers, into one conference content. Here, the audio data incorporated into the conference content is designed so that the speaker can be identified, and the annotation data is designed so that the person who wrote the annotation can be identified with this arrangement, only the speeches and writing by a designated user can be extracted. Also, the number of speakers and the duration of each speech in the conference are controlled, so that only lively discussions in the conference can be extracted.

Figure 24:
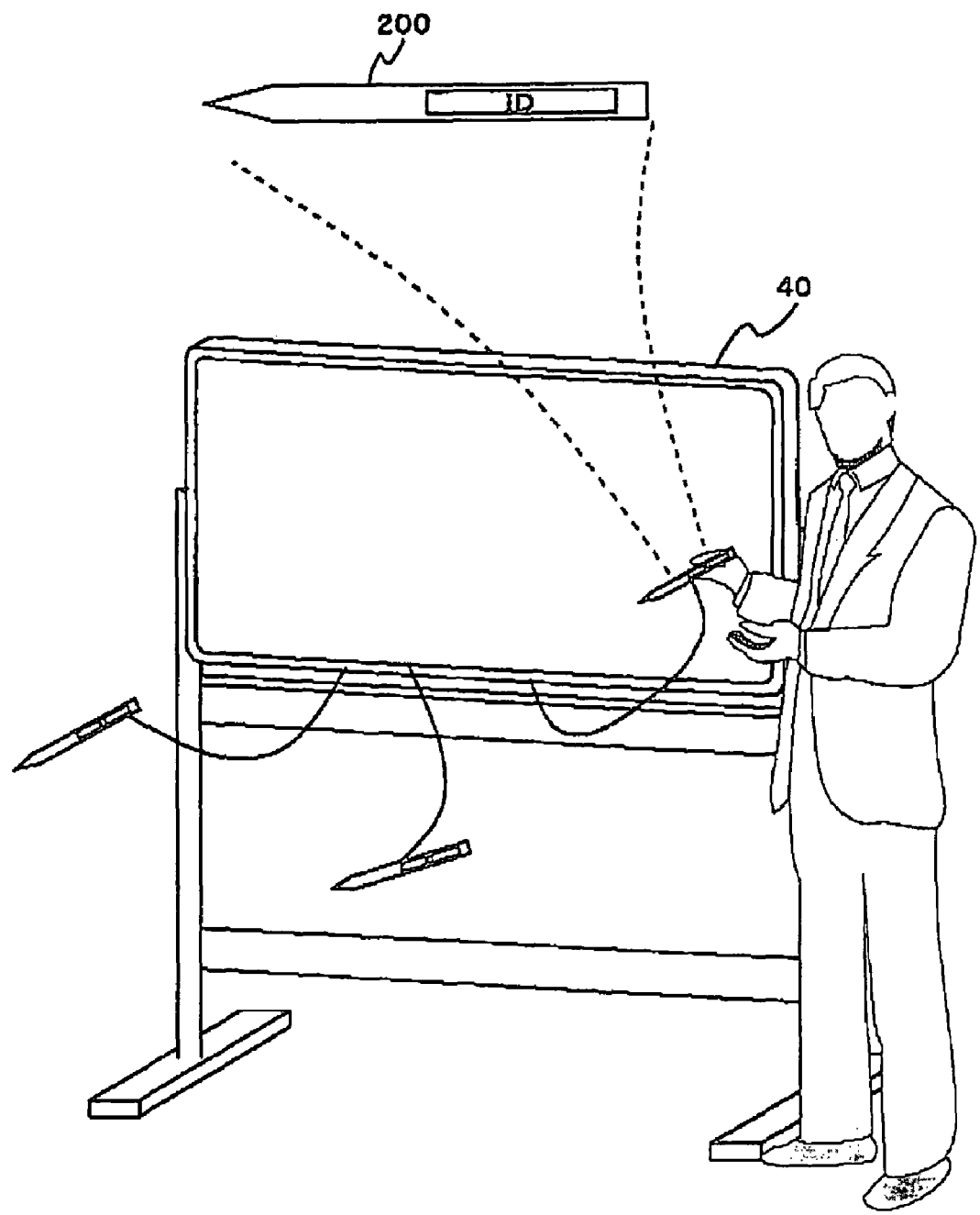
FIG. 24 shows the structure of a display device, and an ID allotted to a pen device.

As shown in FIG. 24, an ID number is allotted to a pen device 200 that performs writing in a display device 40 placed in a conference room. The ID number of the pen device 200 and the identification information (user information) of each participant that performs speeches and writing in the conference are associated with each another and registered in the server device 30. Accordingly, each person (conference participant) who performs writing with the pen device 200 can be identified.

The display device 40 may be a device having a touch panel display formed with touch panels (not shown) overlapped on the display surface. A user can put instructions directly on the display surface of the display unit with the pen device 200 (handwriting input).

Figures 25, 26:
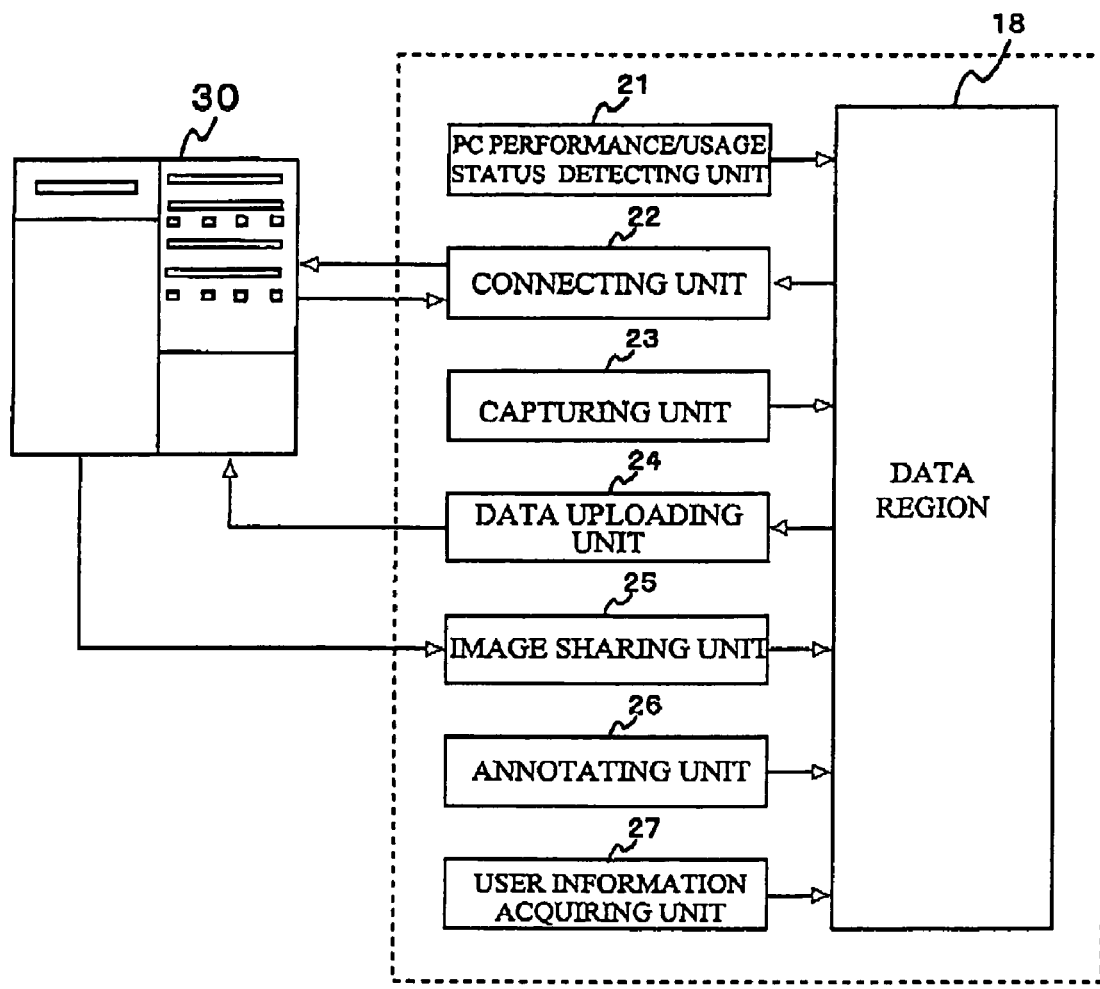
FIG. 25 is a block diagram of the functions to be realized by a computer reading a program written in a USB memory in accordance with a second embodiment of the present invention.
FIG. 26 shows the structure of a management table managed in the server device.

As shown in FIG. 25, the USB memory 10 of this exemplary embodiment further includes a user information acquiring unit 27 (sixth processing portion). The user information acquiring unit 27 acquires the information as to the user who has logged into the computer 100. For example, a command for inquiring for the name of the user who has logged into the computer 100 is issued to the computer 100 having the USB memory 10 inserted thereto, so that the user information can be collected. Also, to collect the user information, an inquiry for the user information is displayed on the monitor 106 of the computer 100, and the user information input by the user can be stored in the data region 18. Alternatively, a RFID device in which user information is recorded may be provided to each user. When a user enters the conference room, the user information is read from the RFID device and is stored in the server device 30. Further, a fingerprint authentication system may be set in the conference room. When entering the conference room, each user can be identified by the fingerprint authentication system. The identified user information is stored in the server device 30. FIG. 26 shows an example structure of a management table that collectively manages the conference ID that identifies the subject conference, user information, the IDs allotted to the pen devices used by respective users, the IP addresses of the computers used by the respective users, and the identification information allotted to the USB memory 10.

Figure 27:
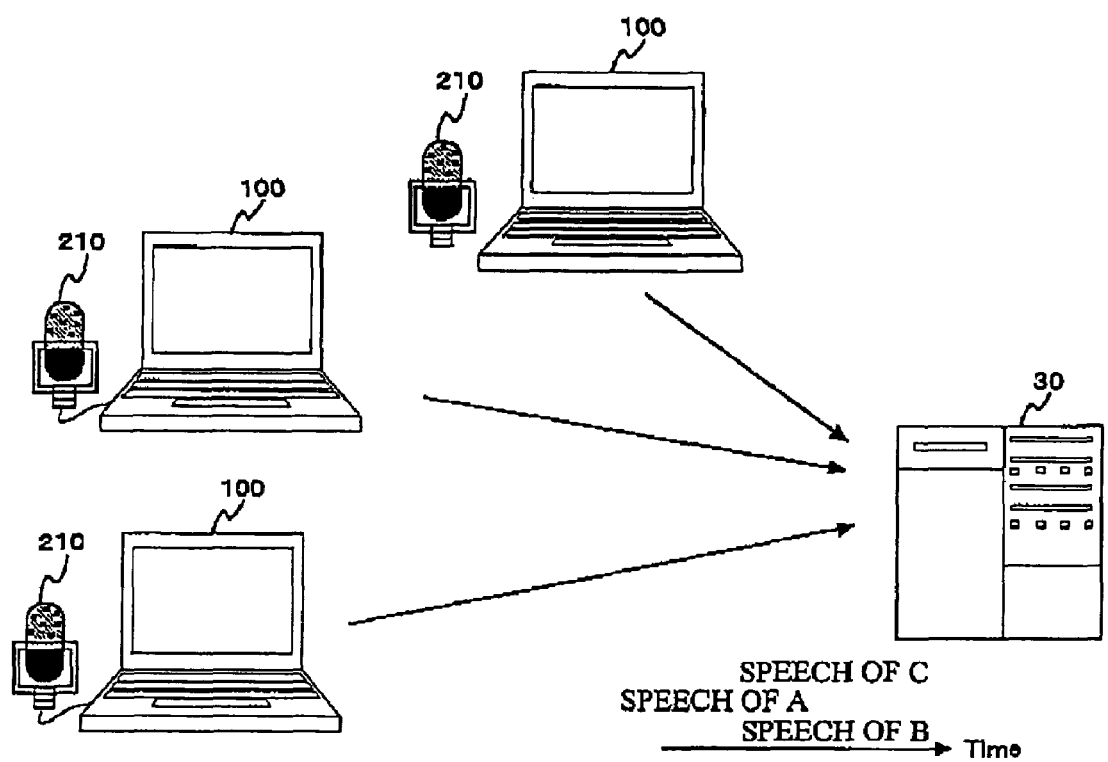
FIG. 27 shows the structure of a system in which a microphone is attached to each one computer.

In this exemplary embodiment, a microphone 210 is connected to the computer 100 each user has brought into the conference room. The microphone 210 is used as a voice input device that picks up speeches of each user. In the example structure shown in FIG. 27, the microphone 210 is attached to each computer 100, and each computer 100 picks up speeches of the user as audio data. The USB memory 10 adds the user information already obtained by the user information acquiring unit 27 to the audio data that is input through the capturing unit 23. The USB memory 10 then uploads those data onto the server device 30.

The server device 30 obtains the audio data accompanied by the user information sent from each computer 100, and stores the audio data. After storing the audio data from each computer 100 connected to the server device 30, the server device 30 performs mixing on the audio data of each user, so as to produce one set of speech data of the conference. In this manner, each speech in the conference can be associated with a user. Also, the number of speakers and the duration of each speech in the conference are controlled, so that only the lively discussions can be extracted and listened to later.

Figure 28:
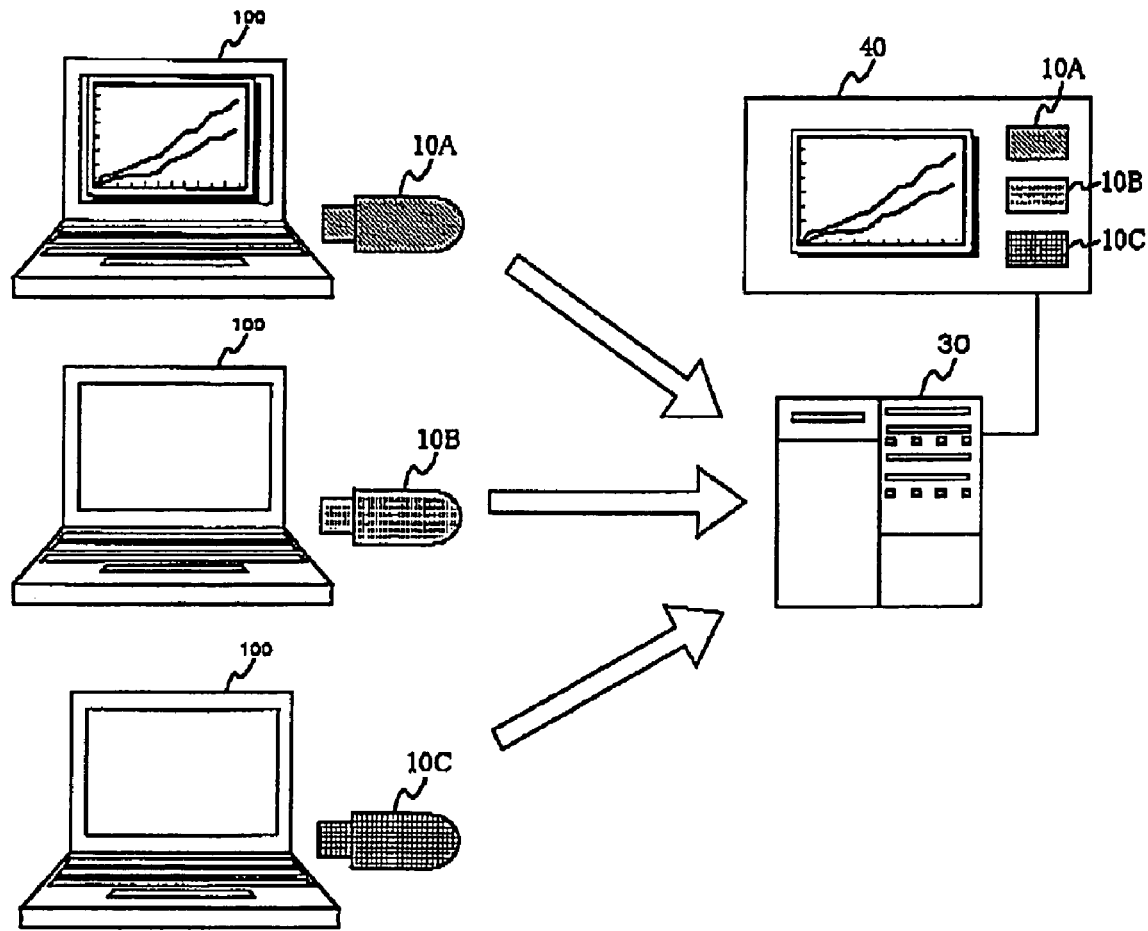
FIG. 28 shows an example case where a computer to upload data onto the server device is selected from icons displayed on the display device.

Also, since the devices used by the respective conference participants are managed as shown in FIG. 26, a computer to upload the screen data onto the server device 30 can be selected by the server device 30 on the side of the display device 40, as shown in FIG. 28. The icons representing the computers 100 or the USB memories 10 are displayed on the display device 40, and the server device 30 can obtain and display the materials displayed on the computer 100 selected by a user.

Figure 29:
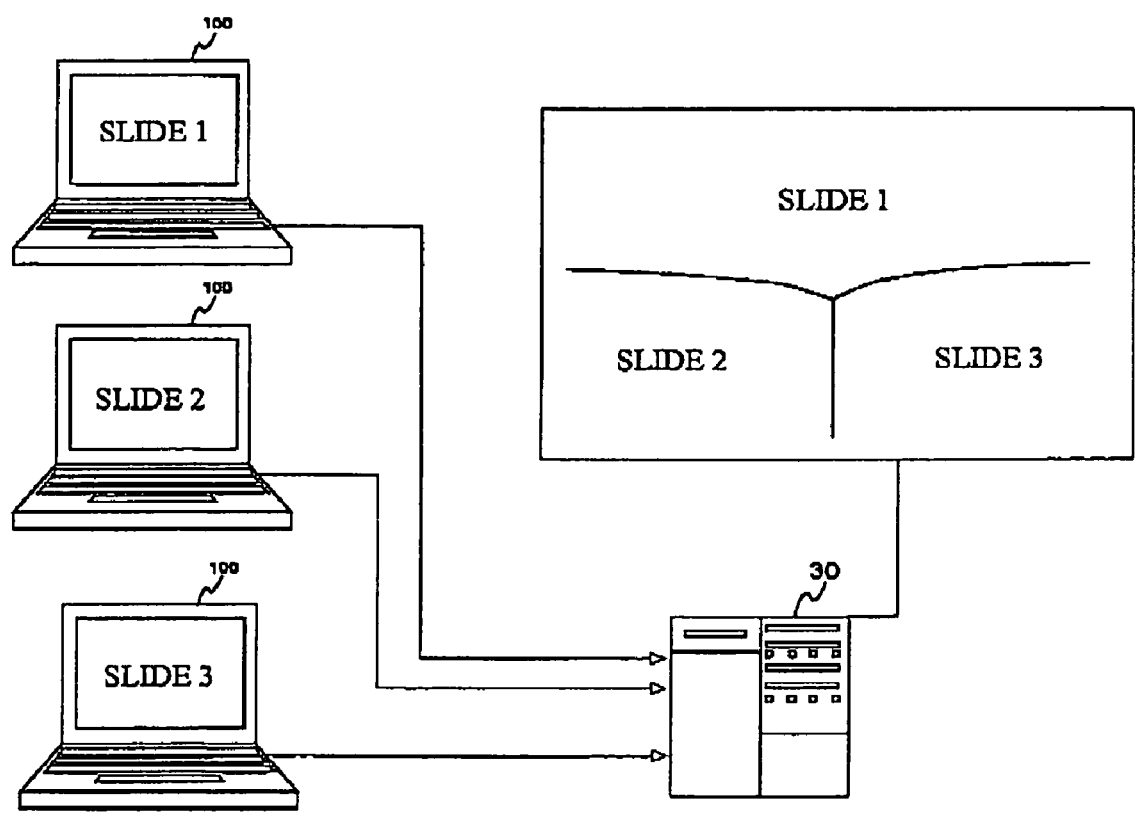
FIG. 29 shows an example case where screen data uploaded from two or more computers is displayed on the display device at once.

Also, when annotation data or screen data stored in the server device 30 is downloaded into a computer 100, the server device 30 can control which data is to be downloaded into which computer 100. Further, when screen data uploaded from computers 100 connected to the server device 30 is displayed on the display device 40, the display area of the display device 40 is divided, so that several materials can be displayed at once, as shown in FIG. 29. This technique is disclosed in Japanese Patent Application Publication No. 2005-293577.

Figure 30:
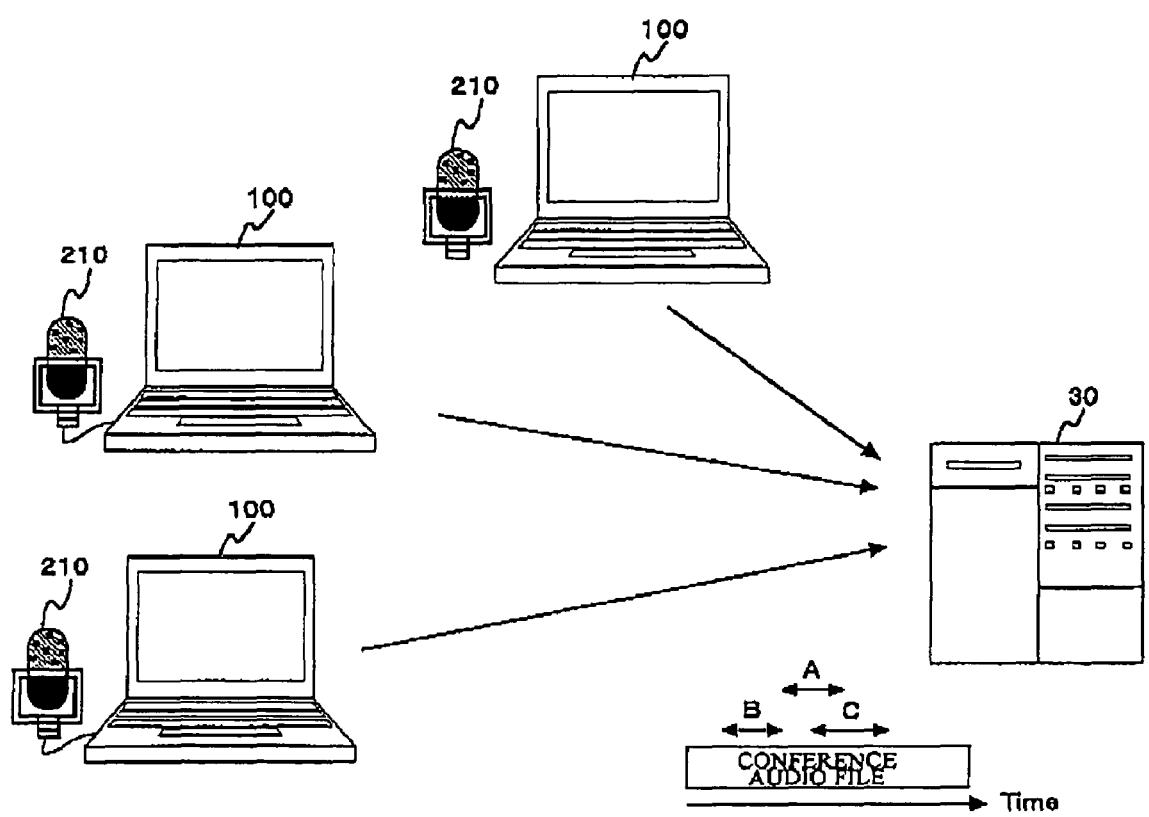
FIG. 30 shows the structure of a system in which a microphone is connected to each one computer and the server device.

In another example of the use of the computers 100 as audio data input devices, a microphone 220 that picks up voices from the entire conference room is connected to the server device 30, as shown in FIG. 30. The voices that are input through the microphone 220 connected to the server device 30 is used as audio data. Each of the computers 100 used by the users transmits the time information to the server device 30, so that the speaker of each speech can be identified. The time information indicates the duration of time during which sound pressure higher than a predetermined value is detected by the microphone 210.

In accordance with a program stored in the data uploading unit 24 of the USB memory 10, each computer 100 detects a speech of the user through the microphone 210, and transmits the speech time information to the server device 30. Receiving the time information from each computer 100, the server device 30 compares the audio data that is input through the connected microphone 220 with the time information that is input from each computer 100. The server device 30 then determines to which conference participant each speech (audio data) belongs.

When two or more conference participants speak at once, the speaker of the audio data with the highest input level may be determined to be the speaker during the period. Alternatively, the speaker that outputs the audio data higher than a threshold value over a predetermined period of time may be determined to be the speaker during the period.

When sound pressure higher than a predetermined value is detected by a microphone, the threshold value of the sound pressure level may be a value that is made an exceptional value through LMedS estimation among all levels.

A network connecting method employed as an aspect of the present invention is realized with a Central Processing Unit (CPU), Read Only Memory (ROM), Random Access Memory (RAM), and the like, by installing a program from a portable memory device or a storage device such as a hard disc device, CD-ROM, DVD, or a flexible disc or downloading the program through a communications line. Then the steps of program are executed as the CPU operates the program.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A portable electronic device comprising a memory area that stores a program to be executed by a computer and data, the portable electronic device connecting the computer and a server device in a communicable state, the portable electronic device first being physically connected to the computer to retrieve first connection information, the portable electronic device then being physically disconnected from the computer and physically connected to the server device to retrieve second connection information and authentication information from the server device, and the portable electronic device then being physically disconnected from the server device and physically re-connected to the computer to provide the second connection information and the authentication information retrieved from the server device, the computer then connecting to the server device using the second connection information and the authentication information, wherein the program includes:

a first processing portion that, when the portable electronic device is physically connected to the server device, retrieves the second connection information from the server device and writes the second connection information in the memory area, the second connection information being necessary for obtaining a connection with the computer; and a second processing portion that, when the portable electronic device is physically connected to the computer, causes the computer to carry out a procedure for obtaining the connection with the server device, using the second connection information necessary for the connection written in the memory area.

2. The portable electronic device according to claim 1, wherein the program further includes a third processing portion that retrieves display data displayed on a display unit of the computer, and stores the display data in the memory area.

3. The portable electronic device according to claim 2, wherein the program further includes a fourth processing portion that uploads the display data stored in the memory area onto the server device connected thereto.

4. The portable electronic device according to claim 1, wherein the program further includes a fifth processing portion that accesses the server device at regular intervals, and downloads display data from another computer registered in the server device.

5. The portable electronic device according to claim 1, wherein the second processing portion causes a display unit of the computer to display communication devices provided both in the computer and the server device, and connects the computer and the server device, using a selected one of the communication devices.

6. The portable electronic device according to claim 1, wherein:

the first processing portion detects information relating to at least one of a capacity and an operation status of the computer to which the electronic device is connected; and the second processing portion sets a transmission rate in communication between the computer and the server device, based on the information.

7. The portable electronic device according to claim 2, wherein:

the first processing portion detects information relating to at least one of a capacity and an operation status of the computer to which the electronic device is connected; and the third processing portion sets a resolution at which an image displayed on the display unit of the computer is captured, based on the information.

8. A network connecting system comprising:

a computer;

a server device; and a portable electronic device that automatically connects the computer and the server device, the portable electronic device first being physically connected to the computer to retrieve first connection information, the portable electronic device then being physically disconnected from the computer and physically connected to the server device to retrieve second connection information and authentication information from the server device, and the portable electronic device then being physically disconnected from the server device and physically re-connected to the computer to provide the second connection information and the authentication information retrieved from the server device, the computer then connecting to the server device using the second connection information and the authentication information, wherein:

the portable electronic device includes a memory area that stores a program to be executed by the computer and data;

the program includes a first processing portion that, when the portable electronic device is physically connected to the computer, retrieves the first connection information from the computer and writes the first connection information in the memory area, the first connection information being necessary for obtaining a connection with the server device, the server device includes: a reading unit that reads the first connection information from the memory area when the portable electronic device is connected thereto;

and a writing unit that writes the second connection information necessary for a connection transmitted from the server device to the computer; and the program further includes a second processing portion that causes the computer, when the portable electronic device is physically connected to the computer, to carry out a procedure for obtaining the connection with the server device, using the second connection information necessary for the connection written in the memory area.

9. The network connecting system according to claim 8, wherein:

the program further includes:

a sixth processing portion that detects information relating to a user using the computer when the portable electronic device is connected to the computer;

a seventh processing portion that retrieves audio data that is input through an audio input unit of the computer; and an eighth processing portion that uploads the audio data and the user information onto the server device.

10. The network connecting system according to claim 9, wherein:

the server device includes a managing unit that manages device identification information for identifying an input device that inputs additional information, identification information as to the computer, and the user information that are associated with one another; and audio data transmitted from computers and additional information input by the input device are managed for users separately from one another.

11. The network connecting system according to claim 8, wherein the program includes:

a sixth processing portion that detects information relating to a user using the computer when the portable electronic device is connected to the computer;

a ninth processing portion that uploads the user information onto the server device, and, when sound pressure higher than a predetermined level is detected by an audio input unit of the computer, the ninth processing portion also uploads time information indicating the time at which the sound pressure is detected; and the server device includes a determining unit that determines a speaker of audio data that is input from an audio input unit of the server device, in accordance with the time information and the user information transmitted from each computer.

12. A network connecting method for connecting a computer and a server device, comprising:

providing a portable electronic device to connect the computer and the server, connecting the portable electronic device to the computer to retrieve first connection information, disconnecting the portable electronic device from the computer, connecting the portable electronic device to the server device to retrieve second connection information and authentication information from the server device, disconnecting the portable electronic device from the server device, and re-connecting the portable electronic device to the computer to provide the second connection information and the authentication information retrieved from the server device, the computer is then enabled to connect to the server device using the second connection information and the authentication information;

acquiring, from the computer, the first connection information necessary for obtaining a connection;

providing the first connection information to the server device, and acquiring the second connection information necessary for the connection to be provided from the server device to the computer; and causing the computer to carry out a procedure for obtaining the connection with the server device, using the second connection information.

13. A non-transitory computer readable medium storing a program causing a computer to execute a process, the process comprising:

providing a portable electronic device to connect the computer and the server, connecting the portable electronic device to the computer to retrieve first connection information, disconnecting the portable electronic device from the computer, connecting the portable electronic device to the server device to retrieve second connection information and authentication information from the server device, disconnecting the portable electronic device from the server device, and re-connecting the portable electronic device to the computer to provide the second connection information and the authentication information retrieved from the server device, the computer is then enabled to connect to the server device using the second connection information and the authentication information;

detecting the first connection information necessary for the computer to obtain a connection with a server device, and, when the portable electronic device is physically connected to the computer, writing the first connection information into the portable electronic device connected to the computer;

retrieving, from the portable electronic device, when the electronic device is physically connected to the server, the second connection information necessary for the connection to be provided from the server device to the computer; and carrying out a procedure for obtaining the connection with the server device, using the second connection information.

14. A network connecting method for connecting a computer and a server device, comprising:

providing a portable electronic device to connect the computer and the server, connecting the portable electronic device to the computer to retrieve first connection information, disconnecting the portable electronic device from the computer, connecting the portable electronic device to the server device to retrieve second connection information and authentication information from the server device, disconnecting the portable electronic device from the server device, and re-connecting the portable electronic device to the computer to provide the second connection information and the authentication information retrieved from the server device, the computer is then enabled to connect to the server device using the second connection information and the authentication information;

retrieving the second connection information from the server device, when the portable electronic device is physically connected to the server device, and writing the second connection information in a memory area, the second connection information being necessary for obtaining a connection with the computer; and causing the computer, when the portable electronic device is physically connected to the computer, to carry out a procedure for obtaining the connection with the server device, using the second connection information necessary for the connection written in the memory area.

15. A portable electronic device comprising a memory area that stores a program to be executed by a computer and data, providing a portable electronic device to connect the computer and the server, connecting the portable electronic device to the computer to retrieve first connection information, disconnecting the portable electronic device from the computer, connecting the portable electronic device to the server device to retrieve second connection information and authentication information from the server device, disconnecting the portable electronic device from the server device, and re-connecting the portable electronic device to the computer to provide the second connection information and the authentication information retrieved from the server device, the computer is then enabled to connect to the server device using the second connection information and the authentication information;

wherein the program includes:

a first processing portion that, when the portable electronic device is physically connected to the computer, retrieves the first connection information from the computer and writes the first connection information in the memory area, the first connection information being necessary for obtaining a connection with the server device, and that retrieves the second connection information from the server device and writes the second connection information in the memory area, when the portable electronic device is connected to the server device, the second connection information being necessary for obtaining a connection with the computer; and a second processing portion that, when the portable electronic device is physically connected to the computer again, causes the computer to carry out a procedure for obtaining the connection with the server device, using the second connection information necessary for the connection written in the memory area.

* * * * *